US007342738B1

(12) United States Patent
Anderson et al.

(10) Patent No.: US 7,342,738 B1
(45) Date of Patent: Mar. 11, 2008

(54) POSITIONING HEAD ASSEMBLY FOR DATA STORAGE SYSTEM WITH MULTIPLE DEGREES OF FREEDOM

(75) Inventors: James S. Anderson, Hugo, MN (US); Todd W. Abrahamson, Woodbury, MN (US); Saeed A. Fahimi, Bloomington, MN (US); Richard E. Jewett, Minneapolis, MN (US); Christopher A. Merton, Hammond, WI (US); Joseph Skorjanec, White Bear Lake, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 11/584,019

(22) Filed: Oct. 20, 2006

(51) Int. Cl.
*G11B 5/584* (2006.01)
(52) U.S. Cl. .................................. 360/77.12
(58) Field of Classification Search ............. 360/77.12, 360/75, 76, 71, 90, 77.04, 129, 291, 81, 261.1; 310/317; 29/603.13
See application file for complete search history.

(56) References Cited

U.S. PATENT DOCUMENTS

| | | | |
|---|---|---|---|
| 5,280,402 A | | 1/1994 | Anderson et al. |
| 5,432,652 A | | 7/1995 | Comeaux et al. |
| 5,450,257 A | | 9/1995 | Tran et al. |
| 5,508,865 A | * | 4/1996 | La Garcia et al. ......... 360/291 |
| 5,621,583 A | * | 4/1997 | Parks et al. .................... 360/81 |
| 5,731,935 A | * | 3/1998 | Lian et al. ................. 360/291 |
| 6,081,402 A | * | 6/2000 | Cho ......................... 360/77.04 |
| 6,222,698 B1 | | 4/2001 | Barndt et al. |
| 6,690,531 B2 | | 2/2004 | Richards et al. |
| 6,754,033 B1 | * | 6/2004 | Argumedo et al. ....... 360/77.12 |
| 6,771,456 B2 | | 8/2004 | Winarski et al. |
| 6,947,247 B2 | * | 9/2005 | Schwarz et al. .............. 360/76 |
| 6,963,467 B2 | * | 11/2005 | Bui et al. .................. 360/77.12 |
| 7,054,093 B1 | | 5/2006 | Anderson et al. |
| 7,054,097 B1 | * | 5/2006 | Yip et al. ................. 360/77.12 |
| 7,054,101 B1 | * | 5/2006 | Marion et al. ................ 360/90 |
| 7,106,544 B2 | * | 9/2006 | Dugas et al. ................. 360/75 |
| 2003/0227702 A1 | | 12/2003 | Watson et al. |
| 2005/0122623 A1 | * | 6/2005 | Dee ........................... 360/129 |
| 2005/0201017 A1 | * | 9/2005 | Koga et al. ................. 360/291 |
| 2006/0186756 A1 | * | 8/2006 | Langlois et al. ............. 310/317 |
| 2006/0285244 A1 | * | 12/2006 | Dugas et al. ............ 360/77.12 |
| 2006/0288566 A1 | * | 12/2006 | Dugas et al. ............. 29/603.13 |
| 2006/0291090 A1 | * | 12/2006 | Dugas et al. ............ 360/77.12 |
| 2007/0058298 A1 | * | 3/2007 | Harper et al. ............ 360/261.1 |
| 2007/0091499 A1 | * | 4/2007 | Saliba ........................ 360/71 |

* cited by examiner

*Primary Examiner*—Fred F. Tzeng
(74) *Attorney, Agent, or Firm*—Eric D. Levinson

(57) ABSTRACT

The Invention Provides a Positioning System for a Linear Data Storage Medium, Such as magnetic tape or other data storage medium in which data is stored on parallel data tracks that extend along a length of the medium. The invention makes use of multiple actuators to control the positioning of sliders carrying read and write elements, e.g., separate sliders carrying the read and write elements, relative to the data storage medium with multiple degrees of freedom. The multiple degrees of freedom may include two or more of a vertical position, a horizontal position, a transverse position, an azimuth position, a zenith position, and a yaw position. In this manner, the invention can improve head-to-track alignment of read heads and write heads with linear data storage systems having very small track pitches, such as track pitches approximately 1 micron and especially less than 1 micron.

20 Claims, 22 Drawing Sheets

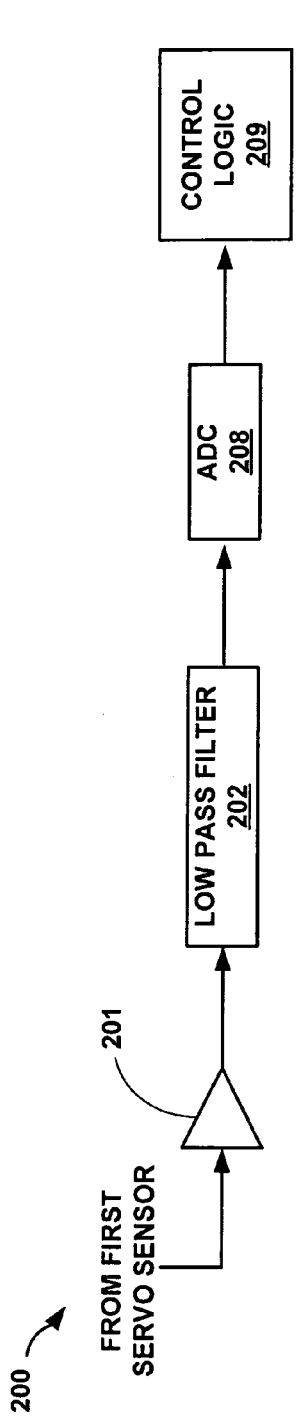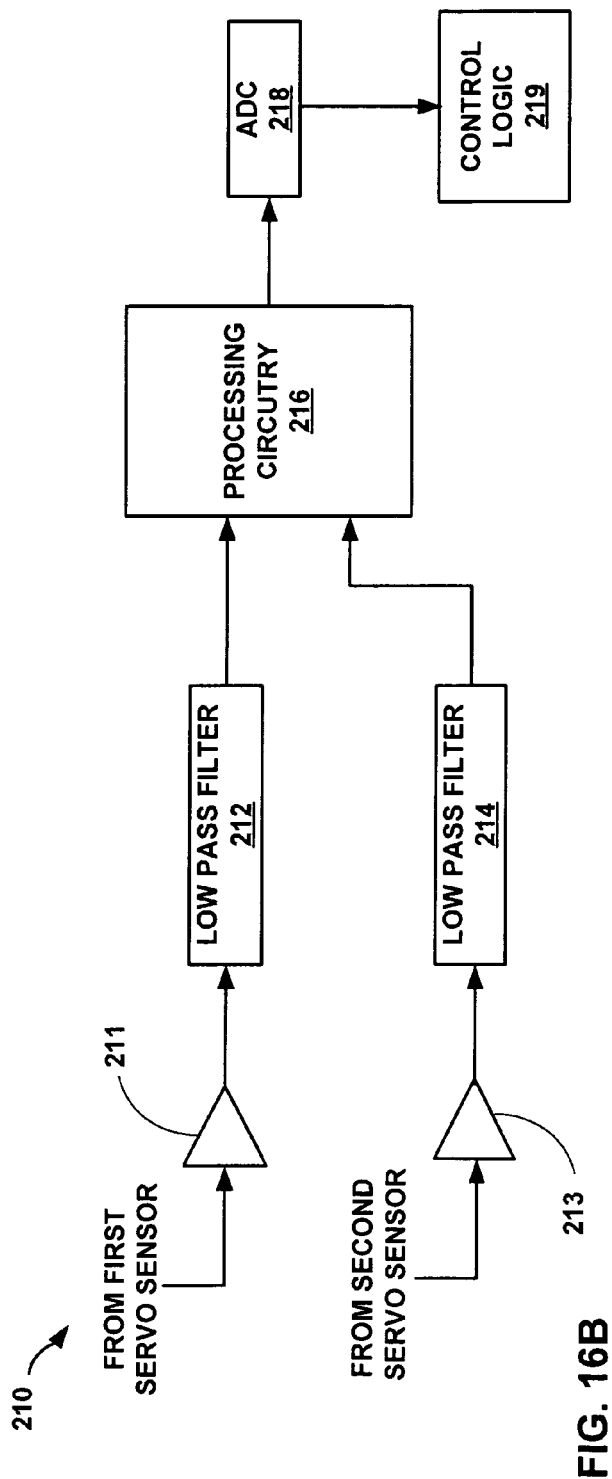
FIG. 16A
FIG. 16B

POSITIONING HEAD ASSEMBLY FOR DATA STORAGE SYSTEM WITH MULTIPLE DEGREES OF FREEDOM

This invention was made with United States Government support under Cooperative Agreement No. 70NANB2H3040 awarded by the National Institute of Standards and Technology (NIST), Advanced Technology Program. The United States Government has certain rights in this invention.

TECHNICAL FIELD

The invention relates to magnetic tape storage media and, more particularly, to actuators for positioning heads for reading and writing data to magnetic tape.

BACKGROUND

Linear data storage media refers to data storage media, such as magnetic tape, in which data is stored in parallel tracks that extend linearly along the length of the media. Examples of linear data storage media include magnetic tape, magneto-optic tape, optical tape, holographic tape, and possibly other tape-like media formats. Magnetic tape media remains an economical medium for storing large amounts of data. For example, magnetic tape cartridges, or large spools of magnetic tape are often used to back up large amounts of data for large computing centers. Magnetic tape cartridges also find application in the backup of data stored on smaller computers such as workstations, desktop or laptop computers.

In magnetic tape, data is typically stored as magnetic signals that are magnetically recorded on the medium surface. The data stored on the magnetic tape is often organized along data tracks, and read/write heads are positioned relative to the data tracks to write data to the tracks or to read data from the tracks. As the number of data tracks increases, the data storage capacity of the magnetic tape likewise increases. However, as the number of data tracks increases, the tracks become narrower and more crowded on the surface of the data storage tape.

Servo tracks or patterns refer to signals or other recorded marks on the magnetic tape and that are used for tracking purposes. In other words, servo patterns are recorded on magnetic tape to provide reference points for tracking the location of data tracks. Servo tracks can improve the ability to locate data tracks, particularly as the tracks become narrower and more crowded on the surface of the data storage tape. For example, a servo controller interprets detected servo tracks and generates position error signals that are used as feedback to adjust the lateral distance of read or write heads relative to the data tracks. Time-based servo patterns and amplitude-based servo patterns are common in magnetic tape.

A wide variety of heads have been designed to write data to magnetic tape. Various heads have also been designed to read data stored on magnetic tape. A magnetic data tape recording system often includes both write heads and read heads to facilitate the writing of information to the magnetic medium and readout of such information for verification that the data was written properly. Read-while-write sliders, for example, typically include a read head and a write head precisely mounted on a slider to facilitate readout and verification of data written by the write head.

Actuators refer to the elements that mechanically position a head with respect to a data storage medium, such as magnetic tape. For high density magnetic tape, actuators may be responsive to position error signals generated based on the readout of servo patterns recorded on the media surface. In some cases, a coarse positioning actuator can be used to position a head in general proximity to a desired location, and a fine positioning actuator can be used to precisely position the head in the desired location. The coarse positioning actuator may define a larger range of motion than the fine positioning actuator, but the fine positioning actuator has greater positioning accuracy.

SUMMARY

The invention provides a positioning system for a linear data storage medium, such as magnetic tape or other data storage medium in which data is stored on parallel data tracks that extend along a length of the medium. The invention makes use of multiple actuators to control the positioning of sliders carrying read and write elements, e.g., separate sliders carrying the read and write elements, relative to the data storage medium with multiple degrees of freedom. The multiple degrees of freedom may include two or more of a vertical position (along the width of the tape), a horizontal position (along the length of the tape), a transverse position (penetration relative to the tape), an azimuth position (rotation about a transverse axis), a zenith position (rotation around the horizontal axis), and a yaw position (rotation around the vertical axis). The invention can improve head-to-track alignment of read heads and write heads with linear data storage systems having very small track pitches, such as track pitches approximately 1 micron and especially less than 1 micron.

In one embodiment, the invention is directed to an apparatus for use in a linear data storage system comprising a slider including at least one of one or more read elements to read data from a linear data storage medium and one or more write elements to write data to the linear data storage medium, and one or more servo elements to read servo marks from the linear data storage medium, and multiple actuators to define a position of the slider relative to a surface of the linear data storage medium with multiple degrees of freedom.

In another embodiment, the invention is directed to a linear data storage system comprising a first slider including one or more read elements to read data from a linear data storage medium and a first servo element to read servo marks from the linear data storage medium, a first set of multiple actuators to define a position of the first slider relative to a surface of the linear data storage medium with multiple degrees of freedom, a second slider including one or more write elements to write data to a linear data storage medium and a second servo element to read servo marks form the linear data storage medium, and a second set of multiple actuators to define a position of the second slider relative to the surface of the linear data storage medium, one or more guides that restrict the movement of the linear data storage medium from unwanted directions and position the linear data storage medium relative to the first and second sliders, and a controller to receive the readback signals generated by one or more of the first and second read elements and servo elements and control the first and second sets of multiple actuators based on the readback signals, wherein the first and second sliders, first and second sets of multiple actuators, and guides are held in a nest structure of a head assembly.

In another embodiment, the invention is directed to a method for positioning a slider in a linear data storage system comprising receiving one or more readback signals from a slider that includes one or more read elements and sensors to read at least one of a recorded and an unrecorded signal from a linear data storage medium, processing the readback signal to determine a position of the slider relative to the linear data storage medium, and adjusting the position of the slider with more than one degree of freedom based on the determined position via one or more actuators, wherein the slider includes at least one of one or more read elements that read data from the linear data storage medium and one or more write elements that write data to the linear data storage medium, and the degrees of freedom include more than one of a vertical position, a horizontal position, a transverse position, a zenith position, an azimuth position, and a yaw position of the slider relative to the surface of the linear data storage medium, wherein the position of the slider is defined in accordance with a three-dimensional (3D) Cartesian coordinate system having a horizontal axis aligned with a longitudinal axis of the linear data storage medium, a vertical axis aligned with a minor axis perpendicular to the longitudinal axis of the linear data storage medium, and a transverse axis aligned with a transverse direction of the linear data storage medium.

The various embodiments of the invention may be capable of providing one or more advantages. Specifically, the invention can improve head-to-track alignment of read heads and write heads. By using multiple actuators, the invention can control the positioning of a head relative to a data storage medium with multiple degrees of freedom and, thus, avoid alignment problems that occur at very small track pitches, such as track pitches of approximately 1 micron and especially less than 1 micron. Notably, for linear data storage systems that record data on the storage medium using an azimuth recording technique, i.e., systems that record data transitions on alternate adjacent tracks at a same but opposite angle, such as a 45 degree angle, relative to an axis along which a slider travels, the invention can allow for adjustments to the yaw component of the position of the slider.

Various slider arrangements are disclosed for single and dual sided data storage. These arrangements typically include write elements and read elements on separate sliders because it may be extremely difficult or even impossible to align write and read elements on a given slider at such small track pitches. The need to precisely align the read elements with the write elements on a given slider is avoided by using separate sliders for the write and read elements. Consequently, separate servo tracking can be performed for each slider, and the position of each slider can be controlled by its own set of actuators.

Further, the invention provides a nest structure for holding the head positioning components, i.e., separate sliders and multiple actuators for each slider, and tape locating components, i.e., guides for restricting the data storage medium from unwanted directions. By packaging the head positioning and tape locating components in a single assembly, i.e., the nest structure, the components can be aligned with high precision more easily than would be possible if the individual head positioning components and tape locating components were aligned independently of each other.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 13-16 are block diagrams illustrating exemplary systems for controlling the position of a slider in accordance with an embodiment of the invention.

DETAILED DESCRIPTION

Figure 1:
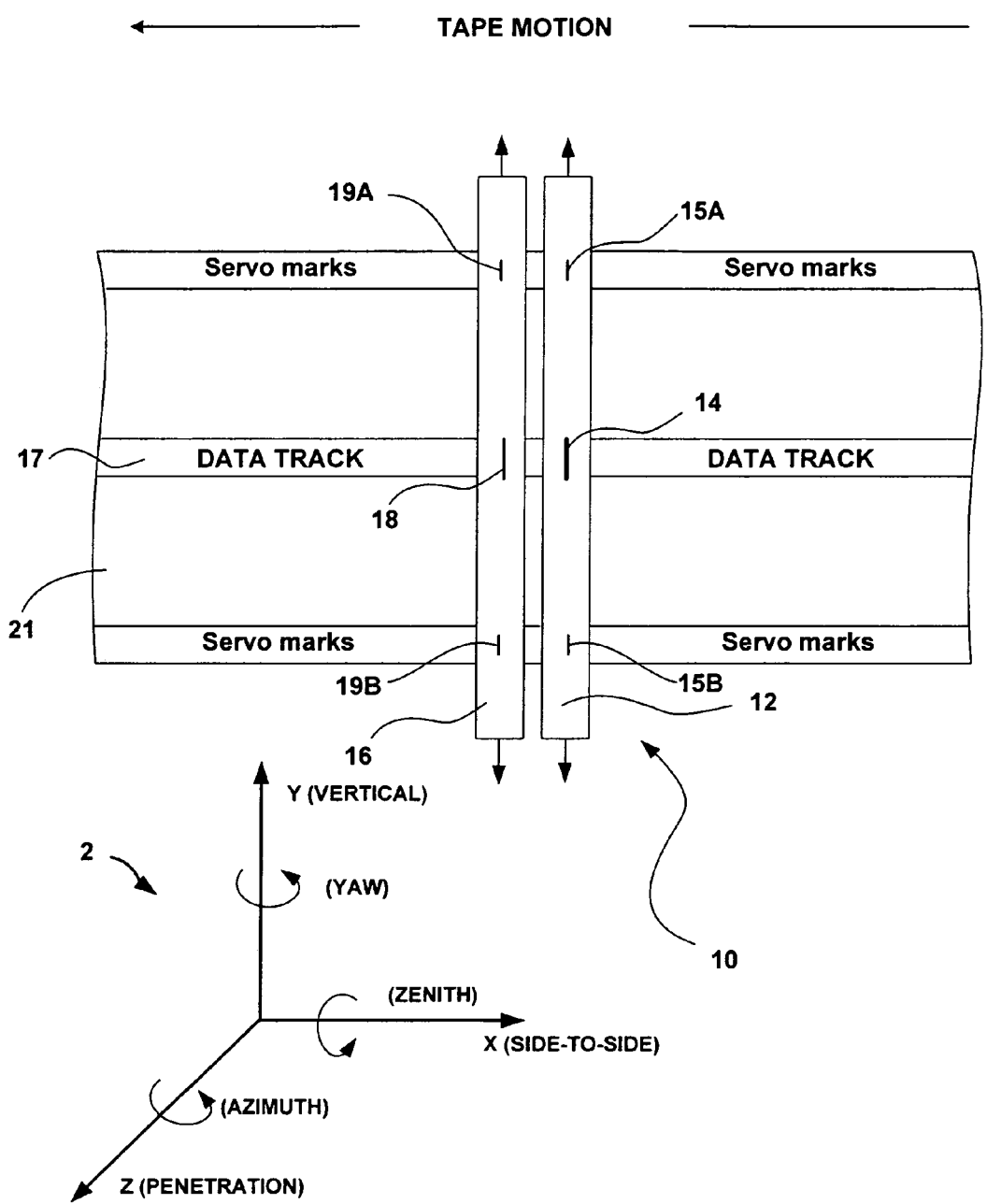
FIG. 1 is a conceptual diagram illustrating a magnetic tape data storage system that includes separate sliders for read and write elements and positions the sliders relative to the magnetic tape with multiple degrees of freedom.

The invention provides a positioning system for a linear data storage medium. A linear data storage medium refers to a medium in which data is stored on parallel data tracks that extend along a length of the medium. Examples of linear data storage media include magnetic tape, magneto-optic tape, optical tape, holographic tape, and possibly other tape-like media formats. It is highly desirable to increase the data storage density of linear data storage medium, and this often entails reducing the track pitch between adjacent data tracks such that a large number of data tracks can be recorded in a given area.

Conventional linear data storage systems for magnetic tape make use of sliders that include read elements and write elements. The read elements are precisely aligned with the write elements on the slider for every channel of the slider, such that for each channel, a write element can write data to magnetic tape and a read element can read the data to verify that it was properly recorded. The slider may also include a servo element to read servo marks recorded on the medium. An actuator can position the slider in response to the detected servo signals in order to properly align the write and read elements with respect to data tracks recorded on the magnetic tape.

As track pitches become smaller, however, it becomes increasingly more difficult to align the write elements with the read elements on a slider. At very small track pitches, such as track pitches of approximately less than 5 microns, alignment becomes particularly difficult. As track pitches become less than approximately 2 microns or less than 1 micron, alignment of read elements with write elements on a slider may be extremely difficult, or even impossible, particularly for mass production. For example, a very slight tilt of the slider can cause misalignment with respect to data tracks at these very small track pitches. Consequently, separate sliders may be used for the read elements and write elements of a read-while-write or a read-after-write system. In this case, separate servo tracking can be performed for each slider, and the position of each slider can be controlled by its own actuator. This avoids the need to precisely align the read element of a given channel with the write element of the given channel, as alignment of the write elements with respect to the data tracks can be performed by servo tracking of one slider and alignment of the read elements with respect to the data tracks can be performed by servo tracking of another slider.

In addition, even when using separate sliders for read elements and write elements, aligning a head with a data track at such small track pitches becomes increasingly difficult because the acceptable alignment tolerance also decreases as the track pitches become smaller. Typically, an actuator is used to mechanically position a head with respect to the magnetic tape, i.e., align a head with a data track on the magnetic tape. In particular, a servo controller may interpret detected servo tracks and generate position error signals that are used as feedback to adjust the lateral distance of a read or write head relative to the data tracks, i.e., move the head across the width of the tape. However, at track pitches of approximately 1 micron and especially less than 1 micron, the signal generated by read and write heads is affected not only by the alignment of the head relative to the data track in a lateral direction, but more is affected more generally by the position of the read and write head relative to the data track and the magnetic tape itself. In other words, the signal is affected by the quality of the head-to-tape media interface (HTMI). Also, thermodynamics can cause expansion of the medium or the head, which can also cause misalignment problems at these small track pitches. Media stretching or width variations can further compound such problems. Thus, alignment of read and write heads for these very small track pitches requires control of multiple degrees of freedom. In order to address these alignment concerns, the invention proposes the use of multiple actuators to control the position of a slider relative to the magnetic tape with multiple degrees of freedom.

These degrees of freedom are defined with reference to a three-dimensional (3D) Cartesian coordinate system with an x-axis aligned along the long direction of the magnetic tape, the y-axis perpendicular to the plane of the tape, and the z-axis aligned with the transverse direction of the tape. Notably, the degrees of freedom include a vertical position (along the y-axis), a horizontal or side-to-side position (along the x-axis), a transverse position or penetration (along the z-axis), an azimuth position (rotation about the z-axis), a zenith position (rotation about the x-axis), and a yaw position (rotation about the y-axis). Adjusting the yaw position of a slider may be particularly useful for systems using an azimuth recording techniques, i.e., systems that record data transitions on alternate adjacent tracks at a same but opposite angle, such as a 45 degree angle, relative to an axis along which a slider travels. By controlling these degrees of freedom, a slider may be positioned to read and write data to media at very small track pitches, such as track pitches of approximately 1 micron and especially less than 1 micron.

Although the invention is described in this disclosure with respect to magnetic tape, the invention is not so limited. Rather, the invention may also be applied to other systems using other linear data storage media, such as magneto-optic tape, optical tape, holographic tape, and possibly other tape-like media formats.

FIG. 1 is a conceptual diagram illustrating a read-while-write system 10 that includes separate sliders for read elements and write elements, in accordance with an embodiment of the invention. In particular a first slider 12 includes a write element 14 and servo elements 15A and 15B, whereas a second slider 16 includes a read element 18 and servo elements 19A and 19B. Servo elements 15A and 15B and servo elements 19A and 19B are located at opposite ends of sliders 12 and 16, respectively.

In other embodiments of the invention, a single slider may carry read elements and associated servo elements as well as write elements and associated servo elements. Two or more of these sliders may be used to read and write data on both sides of magnetic tape or other data storage media.

In general, read element 18 and write element 14 may comprise magnetic heads that define magnetic gaps for readout or recording, respectively. A wide variety of such heads have been developed for such read and/or write functionality, including magneto-resistive (MR) heads, giant magneto-resistive (GMR) heads, inductive heads, thin film heads, C-core heads that include an excitation coil around the C-core, and a wide variety of other types of heads. In general, a write element refers to an element or head that can write data, and a read element refers to an element or head that can read data written by the write element, e.g., for verification. Some heads can both read and write data and could be used as either a read element or a write element, while other types of heads are only suited for reading or writing. A servo element is a more specific type of read element, designed specifically to read servo marks, e.g., of a time-based or amplitude-based servo pattern.

As illustrated, as magnetic tape 21 moves past sliders 12, 16 from right-to-left, write element 14 writes data into track 17 of magnetic tape 21, e.g., as magnetic transitions. In the illustrated example of FIG. 1, data is written into track 17 using an orthogonal recording technique. In orthogonal magnetic tape recording systems, magnetic transitions are recorded perpendicular to the direction of tape motion. However, the invention is not limited to such embodiments. Rather, the invention may also apply to linear data storage systems with data written into tracks using an azimuth recording technique. An azimuth recording technique records magnetic transitions on alternate adjacent tracks at a same but opposite angle relative to an axis which the media travels relative to the head. In this case, instead of the sliders being positioned perpendicular to the direction of tape travel, the head elements are positioned at similar but opposite angles in order to read the data tracks. Accordingly, two sliders that each carry read elements and associated servo elements and write elements and associated servo elements, as previously described, are used to read and write data tracks at opposite angles.

Read element 18 of second slider 16 reads the data written by write element 14 in order to verify the accuracy and integrity of the data. If data is not properly recorded, read element 18 can detect the inaccurate data and write element 14 can re-write the data again, e.g., at another location along medium 21. In this manner, system 10 provides read-while-write functionality.

However, in some cases, read element 18 may become misaligned, i.e., move off of data track 17, and begin to read a signal from an adjacent track (not shown) thereby resulting in erroneous data transfer. Misalignment may occur due to tape lateral motion, vibration in the head assembly, and dimensional instability of the media. Lateral tape motion is the tendency for the tape to shift laterally relative to the linear direction of tape motion. During a write operation, lateral tape motion can cause one or more data tracks to deviate from a desired axis along which tracks are expected to be written. During a reading operation, lateral tape motion can cause misalignment of the read head over the track being read. As a result, a portion of a read element may be positioned over an adjacent data track, i.e., misaligned, and cause an unacceptable level of read errors. For this reason, the lateral position of a slider is controlled, for example, using an actuator, as will be described in detail.

Azimuth recording systems are less susceptible to this type of misalignment than orthogonal recording systems because the adjacent track is at an angle and, thus, can be sufficiently suppressed. However, an azimuth recording system can still experience significant data transfer errors at very small track pitches due to other factors, as will be described in detail.

Typically, an actuator is used to control the lateral position of a slider, i.e., its position across the width of the tape, and includes a fine positioning element and a coarse positioning element, e.g., a stepper motor for coarse positioning and a voice coil motor for fine positioning. In this manner, the position of a slider is controlled with respect to one degree of freedom, i.e., the lateral position of the slider. The position of sliders are not typically controlled with respect to other degrees of freedom, such as a side-to-side or horizontal position relative to the tape, a transverse position (the distance between the tape and the head), an azimuth position (rotation about the axis along the transverse direction of the tape), a zenith position (rotation about the long axis of the tape), and a yaw position (rotation about the axis along the lateral or vertical direction of the tape). Instead, typical sliders are pre-aligned with respect to these degrees of freedom during the manufacturing process.

However, the position of first slider 12 and second slider 16 are controllable with multiple degrees of freedom. In particular, first slider 12 and second slider 16 are separately controllable with multiple degrees of freedom by different sets of actuators (not shown). The actuators may be mounted to the slider or a feature supporting the slider. In the illustrated example, a set of actuators can control first slider 12 in response to servo signals detected by servo elements 15A and 15B whereas another set of actuators can control second slider 16 in response to servo signals detected by servo element 19A and 19B. Separately controlling the position of write element 14 and read element 18 can lead to improved track alignment by avoiding the need to precisely align read heads with write heads on a single slider. In addition, controlling the position of a slider with multiple degrees of freedom becomes necessary at very small track pitches, such as track pitches of approximately 1 micron and less than 1 micron, because the ability to read and write data to magnetic tape is affected by the quality of the head-to-tape media interface (HTMI).

Further, other factors can also affect the ability to read and write data to magnetic tape. For example, when one slider moves in response to the servo signals, the motion of that slider can shift medium 21 slightly because of friction between that slider and medium. When this occurs, the other slider may be misaligned with respect to medium. Also, thermodynamics can cause expansion of the medium or the head thereby causing misalignment problems at these small track pitches. Stretching or width variations in the magnetic tape can further compound such problems. Consequently, in order to reliably read and write data to magnetic tape, positioning of the head must be controlled with multiple degrees of freedom.

These degrees of freedom are defined with reference to a three-dimensional (3D) Cartesian coordinate system 2 with an x-axis aligned along the long direction of the magnetic tape, the y-axis perpendicular to the plane of the tape, and the z-axis aligned with the transverse direction of the tape. 3D Cartesian coordinate system 2 provides a reference for the degrees of freedom throughout this disclosure. Notably, the degrees of freedom include a vertical or lateral position (along the y-axis), a horizontal or side-to-side position (along the x-axis), a transverse or penetration position (along the z-axis), an azimuth position (rotation about the z-axis), a zenith position (rotation about the x-axis), and a yaw position (rotation about the y-axis). Adjusting the yaw position of a slider may be particularly useful for systems using azimuth recording techniques. By controlling these degrees of freedom, a slider may be positioned to read and write data to media at very small track pitches, such as track pitches of approximately 1 micron and especially less than 1 micron.

Figure 2:
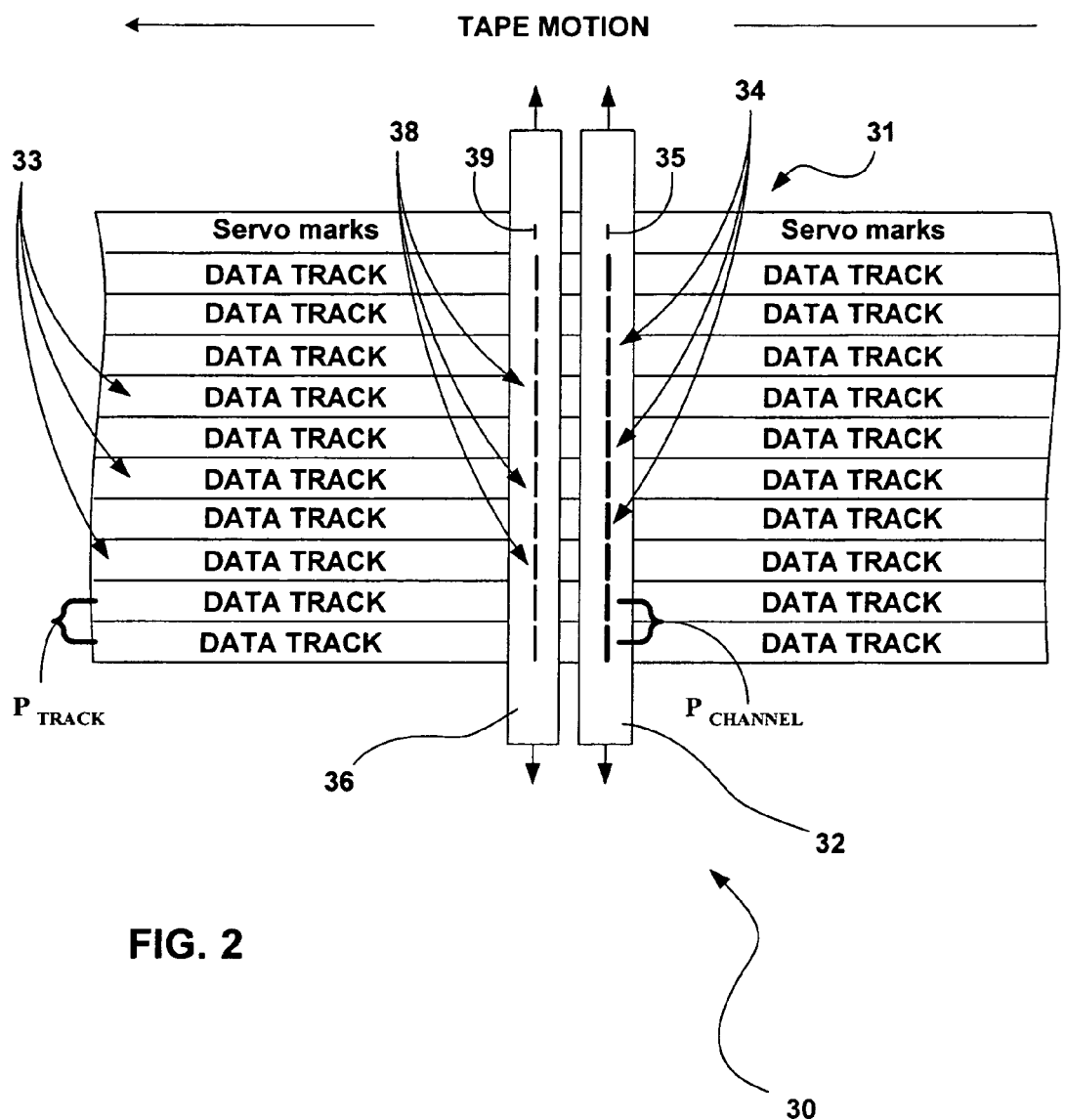
FIG. 2 is another conceptual diagram illustrating a magnetic tape data storage system that includes separate sliders for read and write elements and positions the sliders relative to the magnetic tape with multiple degrees of freedom.

FIG. 2 is another conceptual diagram illustrating a read-while-write system 30 that includes separate sliders for a plurality of read elements and a plurality of write elements. The purpose of FIG. 2 is to illustrate multiple data tracks recorded on a magnetic tape. Accordingly, a first slider 32 includes a plurality of write elements 34 and a servo element 35, whereas a second slider 36 includes a plurality of read elements 38 and a servo element 39. Although a single servo element is shown for each of sliders 32 and 36, each of sliders 32 and 36 may carry multiple servo elements. Multiple servo elements may be used for reading multiple servo tracks on magnetic tape 31 or for reading a single servo track on magnetic tape 31. For example, two servo elements may be located on opposite ends of a head gap line to provide respective signals used to position a slider relative to the magnetic tape. Additionally, as previously described, a slider may include a plurality of read elements and associated servo elements as well as a plurality of write elements and associated servo elements. Such sliders are particularly useful for systems utilizing azimuthal recording techniques.

In the embodiment of FIG. 2, each of read elements 38 of slider 36 corresponds to one of write elements 34 of slider 32. In this manner, the read and write elements define pairs that correspond to each of data tracks 33. The distance between adjacent read elements 38 or adjacent write elements 34 defines the channel pitch of system 30. The channel pitch is labeled "P CHANNEL" in FIG. 2. The distance between adjacent tracks 33 of magnetic tape 31 is refereed to as the track pitch of medium 31. The track pitch is labeled "P TRACK" in FIG. 2. The channel pitch generally refers to the magnetic head while the track pitch generally refers to the written track. Thus, the channel pitch of the write head and the channel pitch of the read head are generally the same. However, the written track pitch is generally identical to the write channel pitch.

As magnetic tape 31 moves past sliders 32, 36 from right-to-left, write elements 34 write data into data tracks 33 of magnetic tape 31, e.g., as magnetic transitions. As shown in FIG. 2, data tracks 33 are written using an orthogonal recording technique, but may also be written using an azimuth recording technique. When written using an azimuth recording technique, sliders 32, 36 may be angled in order to read the data, as previously described in FIG. 1.

Read elements 38 of second slider 36 read the data written by write elements 34 in order to verify the accuracy and integrity of the data. If data is not properly recorded, one of read elements 38 can detect the inaccurate data and the corresponding one of write elements 34 can re-write the data again. In this manner, system 30 provides read-while-write functionality.

As previously described with respect to FIG. 1, read elements 38 and write elements 36 can become misaligned. When read elements 38 become misaligned, they begin to read data from a track adjacent to the desired track thereby resulting in erroneous data transfer. When write elements 36 become misaligned, the data is not written along the expected axis and, thus, may cause an error when trying to read the data at a later time.

As previously described, misalignment between a head and a data track may be caused by tape lateral motion, vibration in the head assembly, and dimensional instability of the media. These types of misalignment generally occur for linear data storage systems with track pitches less than 5 microns and can be resolved by controlling the vertical position of the slider, for example, using an actuator.

However, at track pitches of approximately 1 micron and especially less than 1 micron, the ability to read and write data to magnetic tape is affected by the quality of the HTMI. In other words, at very small track pitches, the signal generated by read and write heads is affected by position of the head relative to the magnetic tape. For example, the signal may be affected by a misalignment in the horizontal position of the head. In another example, the signal may be affected by the distance between the head and the magnetic tape, i.e., the transverse or penetration position. In an additional example, the signal may be affected by a rotation of the slider about the z-axis, i.e., the azimuth position of the slider relative to the magnetic tape. In a further example, the signal may be affected by a rotation of the slider about the x-axis, i.e., the zenith position of the slider relative to the magnetic tape. In yet another embodiment, the signal may be affected by a rotation of the slider about the y-axis, i.e., the yaw position of the slider relative to the magnetic tape. The yaw position may affect the signal substantially with data recorded into tracks using an azimuth recording technique. Consequently, the quality of the HTMI and, thus, the signal generated by a head, is determined by multiple degrees of freedom for the position of the slider.

The ability to read and write data to magnetic tape may also be affected by additional factors. These factors include, but are not limited to, shifting of the slider due to friction between the slider and the magnetic tape, thermodynamics causing expansion of the magnetic tape or the head, or stretching and width variations in the magnetic tape as the tape streams past the head.

In order to address these alignment issues, first slider 32 and second slider 36 are separately controllable by different sets of actuators (not shown). Each set of actuators can control the position of the respective slider with multiple degrees of freedom, i.e., a vertical position, a horizontal position, a transverse position, an azimuth position, a zenith position, and a yaw position as previously described. Again, the degrees of freedom are defined relative to 3D Cartesian coordinate system 2 of FIG. 1.

In particular, a set of actuators can control first slider 32 in response to servo signals detected by servo element 35, whereas another set of actuators can control second slider 36 in response to servo signals detected by servo element 39. Controlling sliders 32, 36 with multiple degrees of freedom improves the quality of the HTMI and, thus, can improve the reliability for reading and writing data to magnetic tape 31. For very small track pitches, such as track pitches of approximately 1 micron and especially less than 1 micron, positioning control with multiple degrees of freedom becomes very important. At these track pitches, alignment of sliders relative to magnetic tape becomes very difficult.

Figure 3:
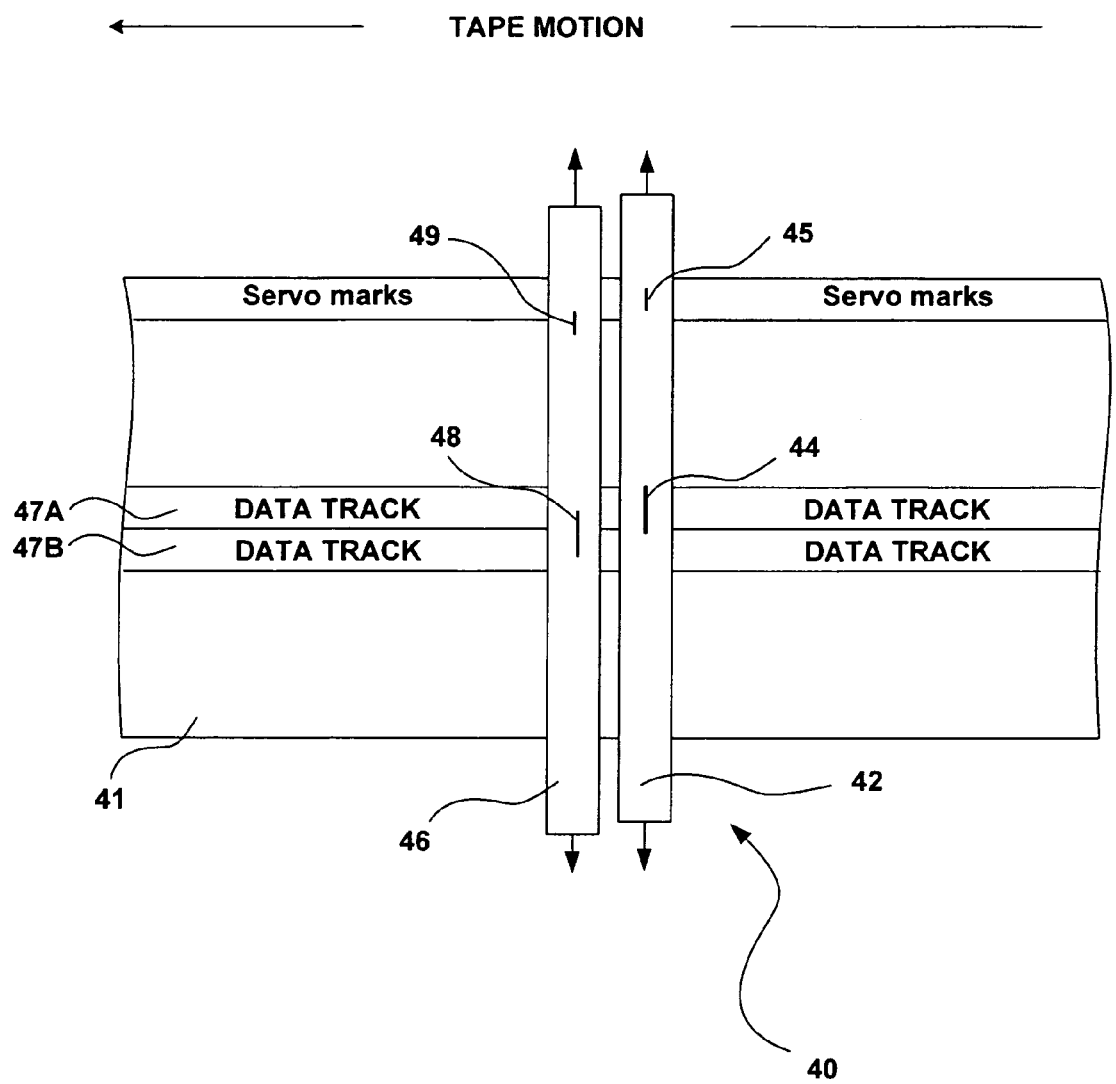
FIG. 3 is another conceptual diagram illustrating a magnetic data storage system that includes separate sliders for read and write elements which are misaligned with a data track on the magnetic tape.

FIG. 3 is a conceptual diagram illustrating a read-while-write system 40 that includes separate sliders that are positioned with multiple degrees of freedom in accordance with an embodiment of the invention. The purpose of FIG. 3 is to illustrate a slider that is misaligned in the vertical direction.

Similar to system 10 of FIG. 1, system 40 comprises a first slider 42 that includes a write element 44 and a servo element 45 and a second slider 46 that includes a read element 48 and a servo element 49. Alternatively, the same scenario may occur with two sliders that each carry read elements and associated servo elements as well as write elements and associated servo elements. In any case, system 40 also functions similar to system 10. In other words, as magnetic tape 41 moves past sliders 42, 46 from right-to-left, write element 44 writes data into track 47A of magnetic tape 41 and read element 48 reads data from data track 47B. The position of each of sliders 42, 46 is controlled by a separate set of actuators (not shown). As previously described, each set of actuators controls the position of the corresponding slider with multiple degrees of freedom.

However, unlike system 10 in which sliders 12, 16 are properly aligned with data track 17, slider 46 is misaligned relative to magnetic tape 41. In particular, the vertical position of slider 46 is misaligned relative to data track 47A. Accordingly, read element 48 is shown in FIG. 3 as being partially aligned over adjacent data track 47B as well as track 47A. This misalignment may cause read element 48 to erroneously read data from data track 47A because the signal generated by read element 48 is a function of data recorded on data track 47A and 47B.

In operation, control of the vertical position of slider 46 is accomplished through the analysis of a signal, e.g., a readback signal, generated by a servo sensor. One or more actuators mounted to slider 46 or a feature supporting 46 may adjust the vertical position of slider 46 based on the signal. An example control system and process are described in greater detail in block diagram FIG. 14 and the flowchart of FIG. 21.

Figure 4:
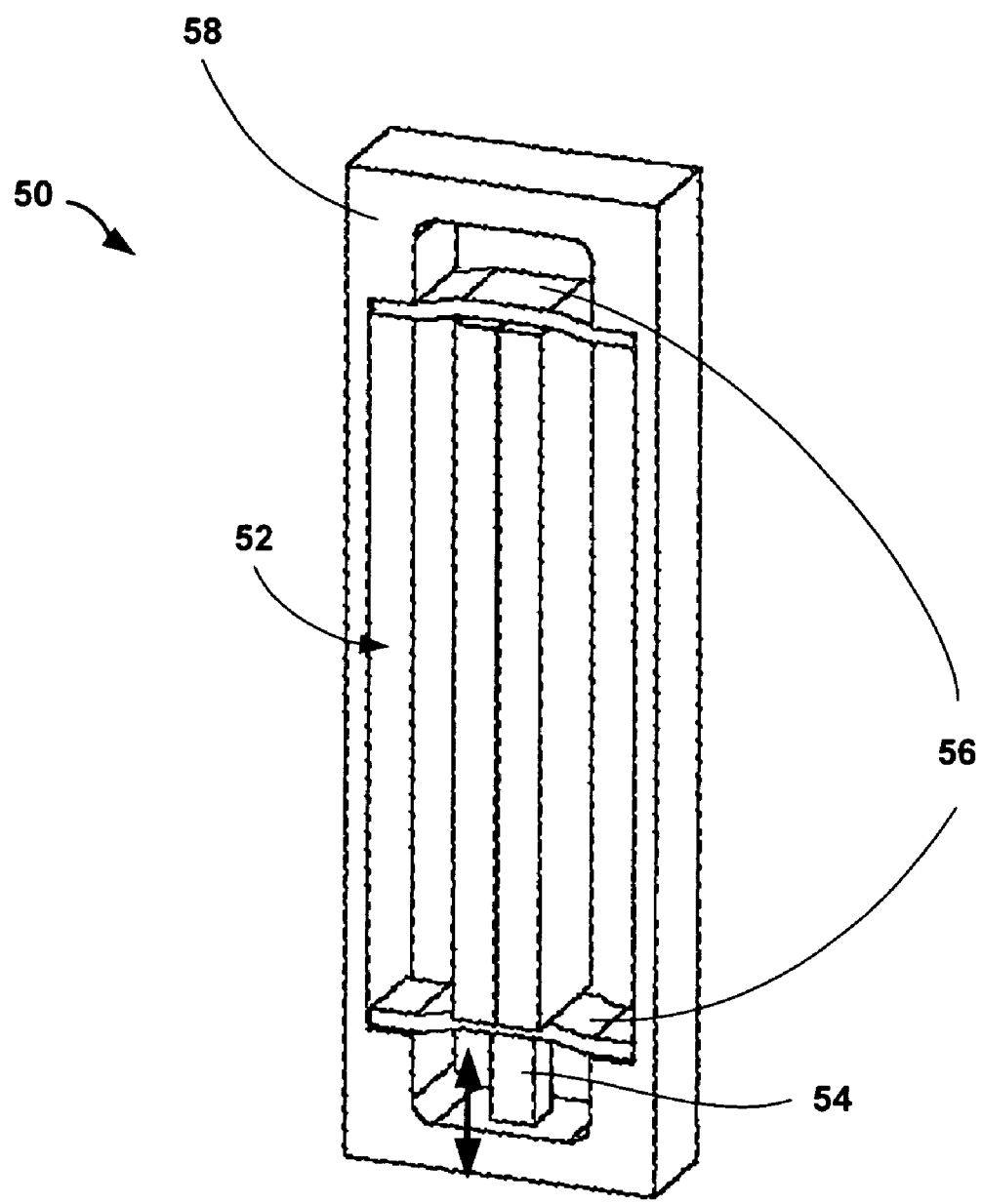
FIG. 4 is a schematic diagram illustrating an exemplary slider with an actuator for controlling the vertical position of the slider in accordance with an embodiment of the invention.

FIG. 4 is a schematic diagram illustrating an exemplary slider 50 with an actuator 54 for controlling the vertical position of slider 50 in accordance with an embodiment of the invention. In the illustrated example, slider 50 includes head assembly 52, springs 56, and support structure 58. Although not shown for purposes of clarity, head assembly 52 includes head elements, e.g., either write elements to write data to a magnetic tape and read elements to read data from a magnetic tape, and a servo element to read servo marks on the magnetic data tape.

In particular, actuator 54 is illustrated as being positioned directly beneath head assembly 52. By positioning actuator 54 in this manner, i.e., such that the force vector goes directly through the head-to-tape interface, the phase lag in the response of head assembly 52 to input from actuator 54 may be reduced. Additionally, actuator 54 may reduce frictional coupling between slider 50 and magnetic tape by positioning head assembly 52 independently of slider 50. Actuator 54 may comprise a laminate piezo motor. Other actuating motors can be substituted for a piezo actuator, such as voice coil motors, rotation lead screw motors, magnetoresistive actuators, linear motors, hydraulic or pneumatic actuators, a stepper motor, and other actuators capable of providing suitable fine and/or coarse positioning of slider 50. However, a laminate piezo motor may provide certain advantages. For example, a piezo motor and appropriate positioning structure, such as slider 50, may substantially increase bandwidth by approximately fifty percent or more. A laminate piezo motor may also reduce heat dissipation. Further, a laminate piezo does not use or generate a magnetic field.

Although FIG. 4 only shows actuator 54 for controlling the vertical position of head assembly 52, slider 50 may include more actuators for controlling its position with additional degrees of freedom. Additional actuators have been purposely omitted from FIG. 4 in the interest of clarity. FIGS. 6, 8-11, and 13 illustrate various arrangements of actuators used to control the position of sliders with different degrees of freedom.

Springs 56 may comprise stiff springs that are preloaded to provide a consistent spring rate mounted into a stiff housing that can be coarsely positioned. Stiff springs may provide certain advantages. For example, stiff springs may facilitate high bandwidth, good control of out of plane motions, and a reduced effect of the flex circuit on the transfer function.

Figure 5A:
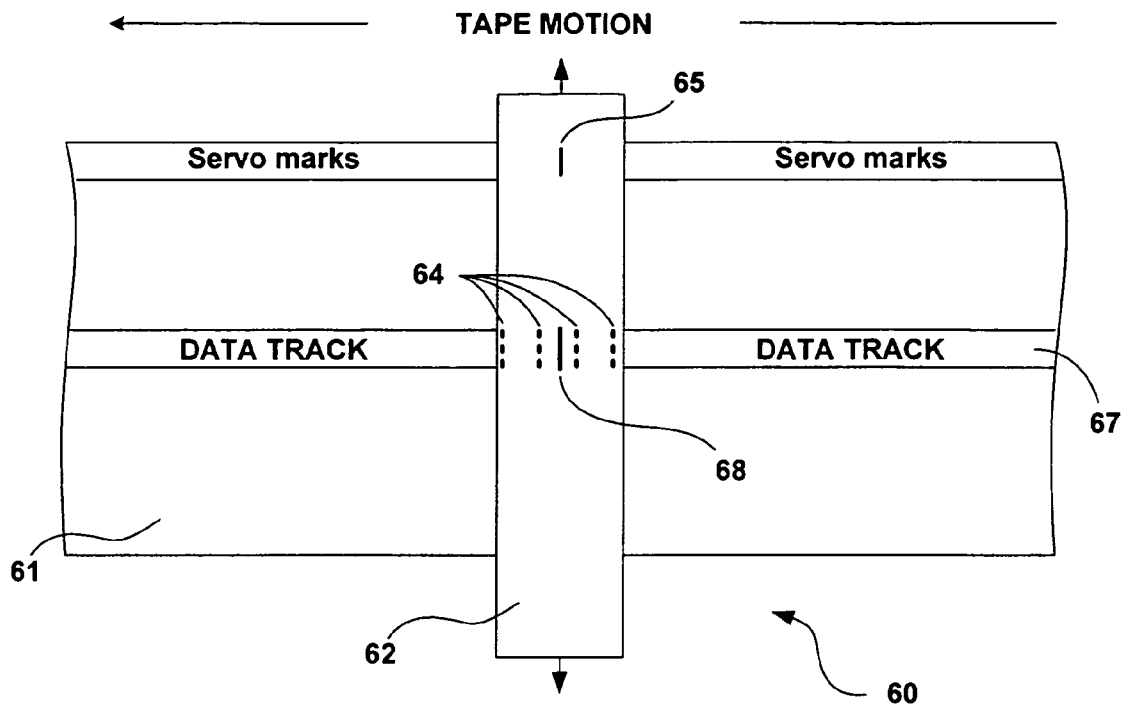
FIGS. 5A and 5B are conceptual diagrams illustrating the system with a slider that is misaligned with a data track on the magnetic tape.

FIG. 5A is a conceptual diagram illustrating a read-while-write system 60 that is misaligned in the horizontal position. In the illustrated example, only a single slider 62 is shown in the interest of clarity. Slider 62 includes a head element 68, e.g., a write element, a read element, or both, and a servo element 65 associated with the read and/or write elements. Accordingly, it is understood that system 60 includes another slider (not shown) that performs the remaining read or write operations.

As magnetic tape 61 moves past slider 62, head element 68 either reads data transitions 64 or reads or writes data transitions 64 into data track 67 depending on the type of head element that head element 68 is, i.e., a read element or a write element. However, as shown in FIG. 5A, head element 68 is located between data transitions 64 and, thus, is misaligned in the horizontal direction, i.e., along direction of tape motion. The misalignment may be caused by stretching of magnetic tape 61, e.g., due to thermodynamics or mechanical strain, vibrations of the head assembly, or friction between slider 62 and magnetic tape 61. In any case, the misalignment may result in slider 62 erroneously reading data from data track 67.

Figure 6:
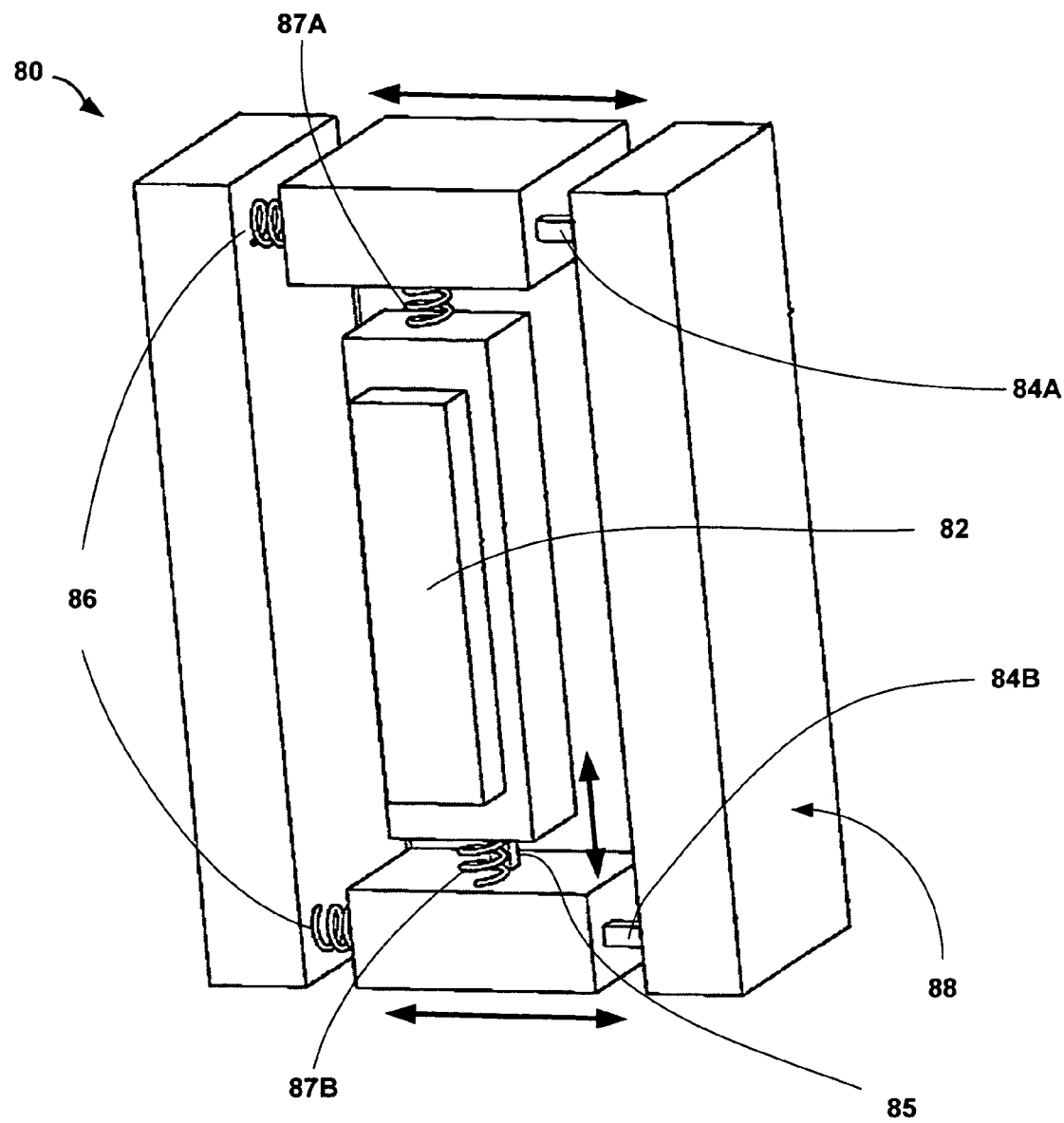
FIG. 6 is a schematic diagram illustrating an exemplary slider and actuators for controlling the horizontal and azimuth position of the slider in accordance with an embodiment of the invention.

During operation, control of the horizontal position of slider 62 is provided by one or more actuators (not shown). An exemplary slider having actuators that control the horizontal position of the slider is illustrated in FIG. 6. As previously described, a servo readback signal generated by servo element 65 may be processed to determine the position of the slider and, thus, adjust the horizontal position of slider 62 to correct the misalignment.

Figure 5B:
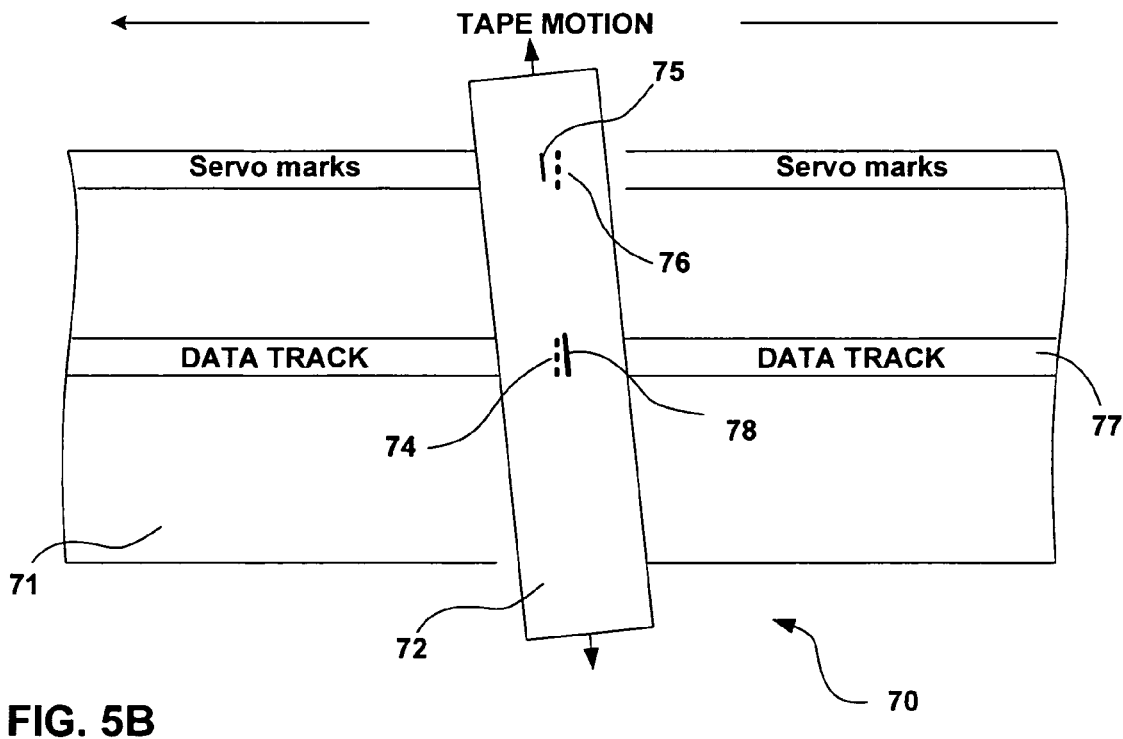

FIG. 5B is a conceptual diagram illustrating a read-while-write system 70 that is misaligned in the azimuth position. In the illustrated example, only a single slider 72 is shown in the interest of clarity. Slider 72 includes a head element 78, e.g., a write element, a read element, or both, and a servo element 76 associated with the write and/or read elements. Accordingly, it is understood that system 70 includes another slider (not shown) that performs the remaining read or write operations.

As magnetic tape 71 moves past slider 72, head element 78 either reads data transitions 74 or reads or writes data transitions 74 into data track 77 depending on the type of head element that head element 78 is, i.e., a read element or a write element. However, as shown in FIG. 5B, head element 78 is misaligned in the azimuth direction, i.e., rotated about the z-axis. This misalignment may occur due to flexibility in magnetic tape 71.

During operation, control of the horizontal position of slider 72 is provided by more than one actuator (not shown). Typically, a pair of actuators operating in a coordinated fashion can control the azimuth position of a slider. A servo readback signal generated by servo element 75 may be processed to determine the position of the slider and, thus, adjust the azimuth position of slider 72 to correct the misalignment. For example, by adjusting the azimuth position, the effective track pitch of head element 78 can be reduced without adversely effecting the signal-to-noise ratio. Additionally, each head element on a slider can be measured for its unique gap spacing and a static azimuth angle can be set for each head element for the correct gap spacing. Thus, as the tape's azimuth angle changes during stream, the servo signal read from heads on opposite sides of the slider can be used to adjust the azimuth position to compensate for dynamic changes.

FIG. 6 is a schematic diagram illustrating an exemplary slider 80 and actuators 84A and 84B (herein "actuators 84") for controlling the horizontal and azimuth position of slider 80 in accordance with an embodiment the invention. In the illustrated example, slider 80 includes head assembly 82, springs 86, springs 87A and 87B (herein "springs 87"), and support structure 88. Although not shown for purposes of clarity, head assembly 82 includes head elements, e.g., either write elements to write data to a magnetic tape and read elements to read data from a magnetic tape, and servo elements to read servo marks on the magnetic data tape.

As shown in FIG. 6, actuators 84 are mounted to various support structures 88. In particular, actuators 84 are mounted between support structures on one side and springs 86 are mounted between support structures on the opposite side. Actuators 84 may operate in a coordinated manner to adjust the horizontal or azimuth position of head assembly 82. In order to adjust the horizontal position of head assembly 82, for example, actuators 84 may both move head assembly 82 the same distance. However, in order to adjust the azimuth position, only one of the actuators may move head assembly 82 a given distance. Alternatively, actuators 84 may work in opposition to each other to adjust the azimuth position of head assembly 82. In other words, one of actuators 84 may move head assembly 82 in one direction and the other one of actuators 84 may move head assembly 82 in the opposite direction. Similar to springs 56 described in FIG. 4, springs 86 may comprise stiff springs that are preloaded to provide a consistent spring rate in order to facilitate high bandwidth, good control of out-of-plane motions, and a reduced effect of the flex circuit on the transfer function.

FIG. 6 also shows actuator 85 and springs 87 for controlling the vertical position of head assembly 82. Actuators 84 and 85 may comprise any of the previously described actuators. Although not shown in FIG. 6, slider 80 may include additional actuators for controlling its position with other degrees of freedom, such as a penetration position, a zenith position, and a yaw position.

Figure 13:
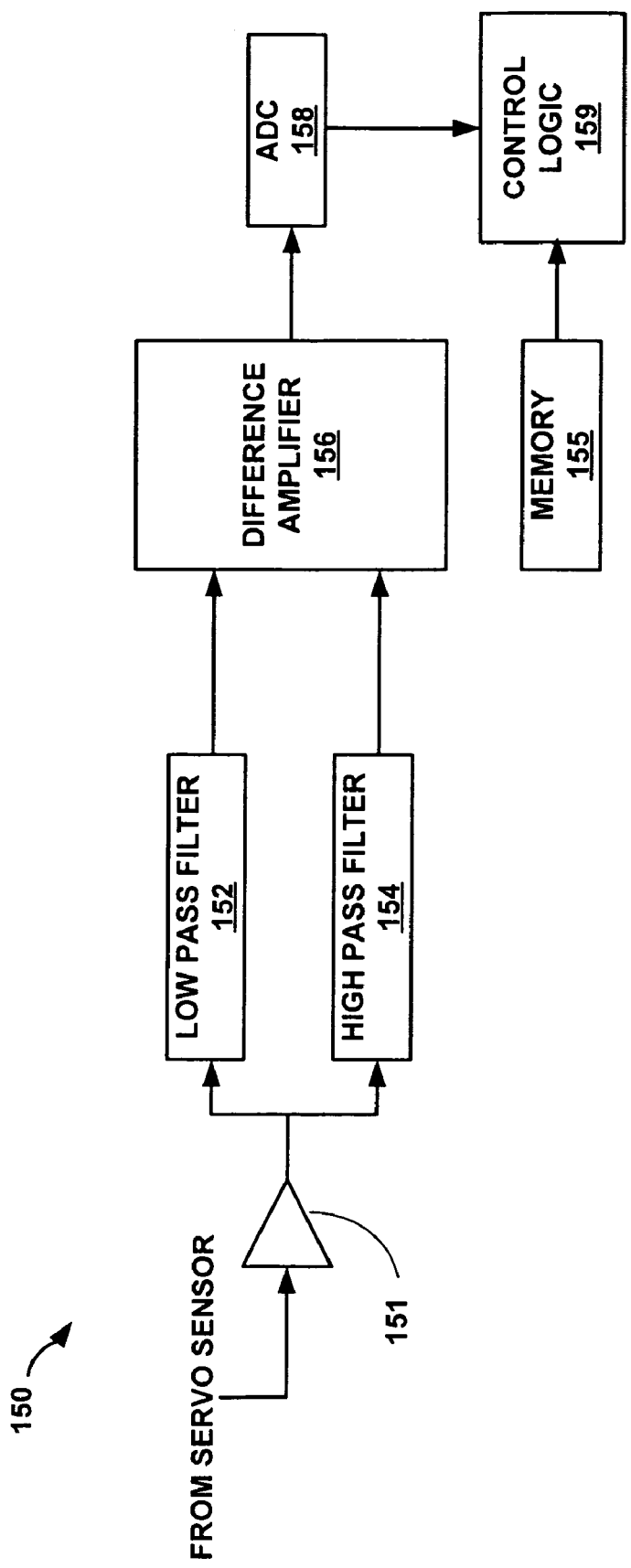
Figure 14:
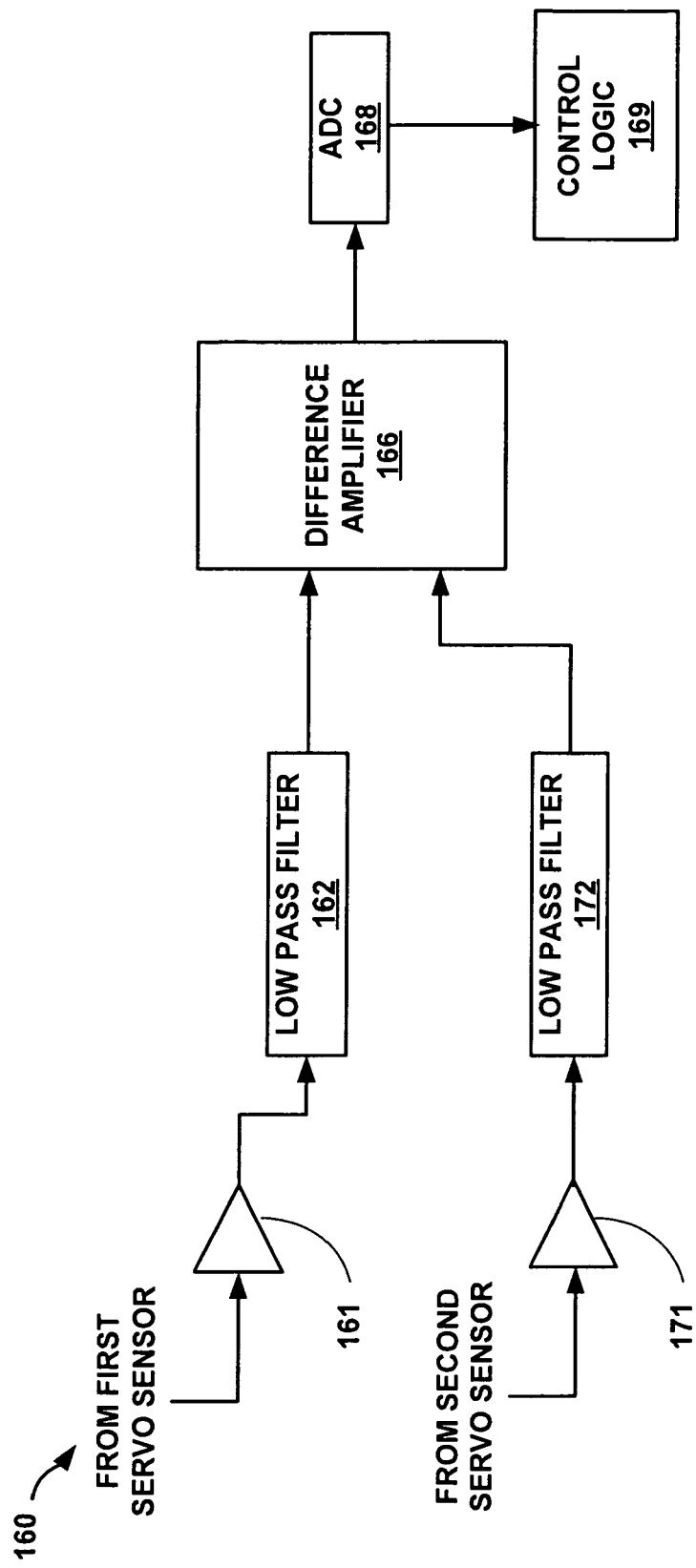
Figure 15:
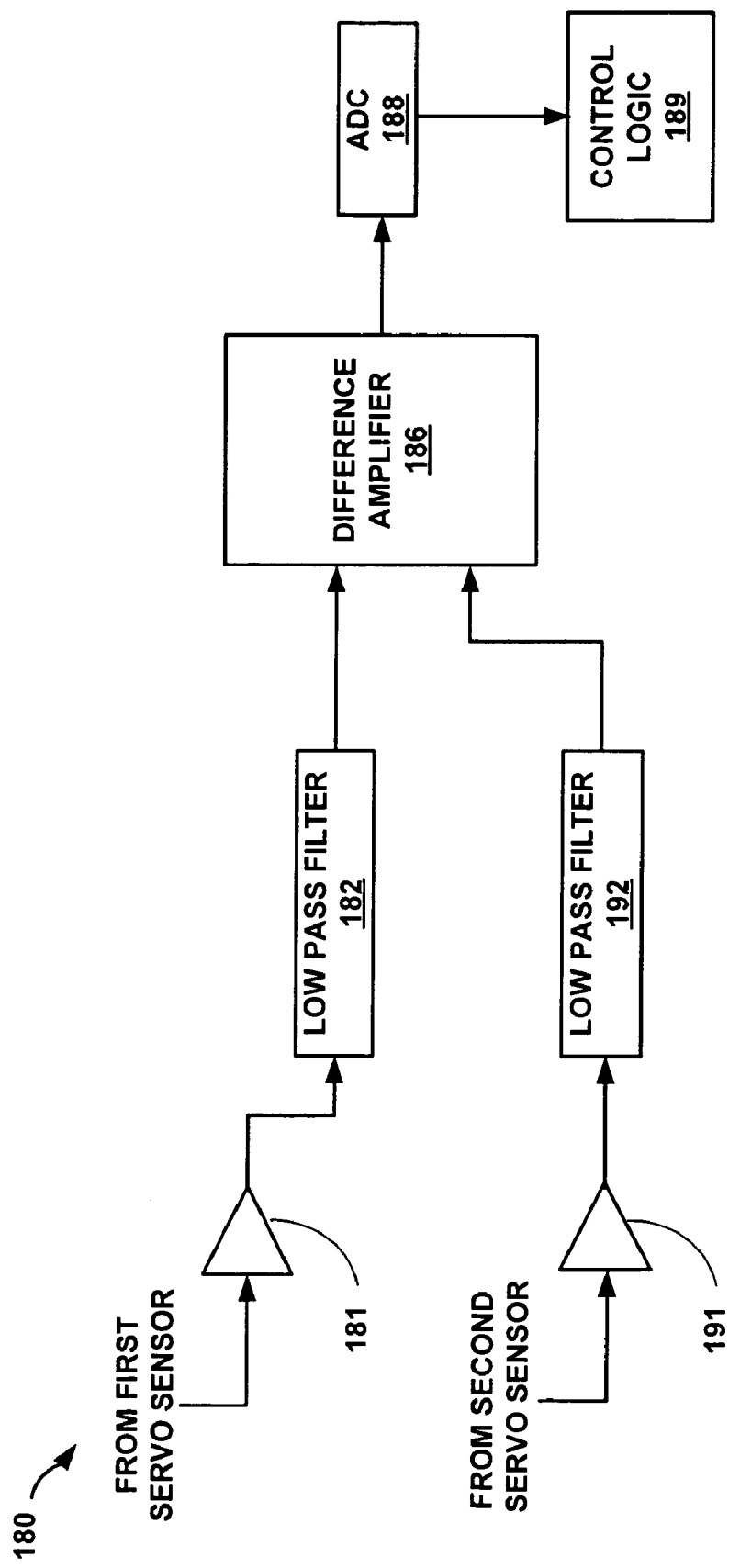

FIGS. 7-10 illustrate various systems for controlling the penetration of a head relative to magnetic tape. By controlling the penetration of a head, the system can maximize signal while minimizing tape noise. In particular, FIGS. 7-10 illustrate various adjustment mechanisms, i.e., various configurations of head assemblies and sliders and actuators for positioning the head assemblies and/or sliders. FIGS. 13, 14, and 15 illustrate exemplary control systems for controlling the operation of the systems illustrated in FIGS. 7-10.

A reduced head-to-tape spacing permits greater linear densities to be achieved. Thus, it is important to control the head-to-tape spacing. Typical linear data storage systems rely on asperity contact to control the head-to-tape spacing. However, the invention provides a system, i.e., head and slider for reading and writing magnetic data to tape, and method for controlling the head or the tape to define the head-to-tape spacing.

Figure 7:
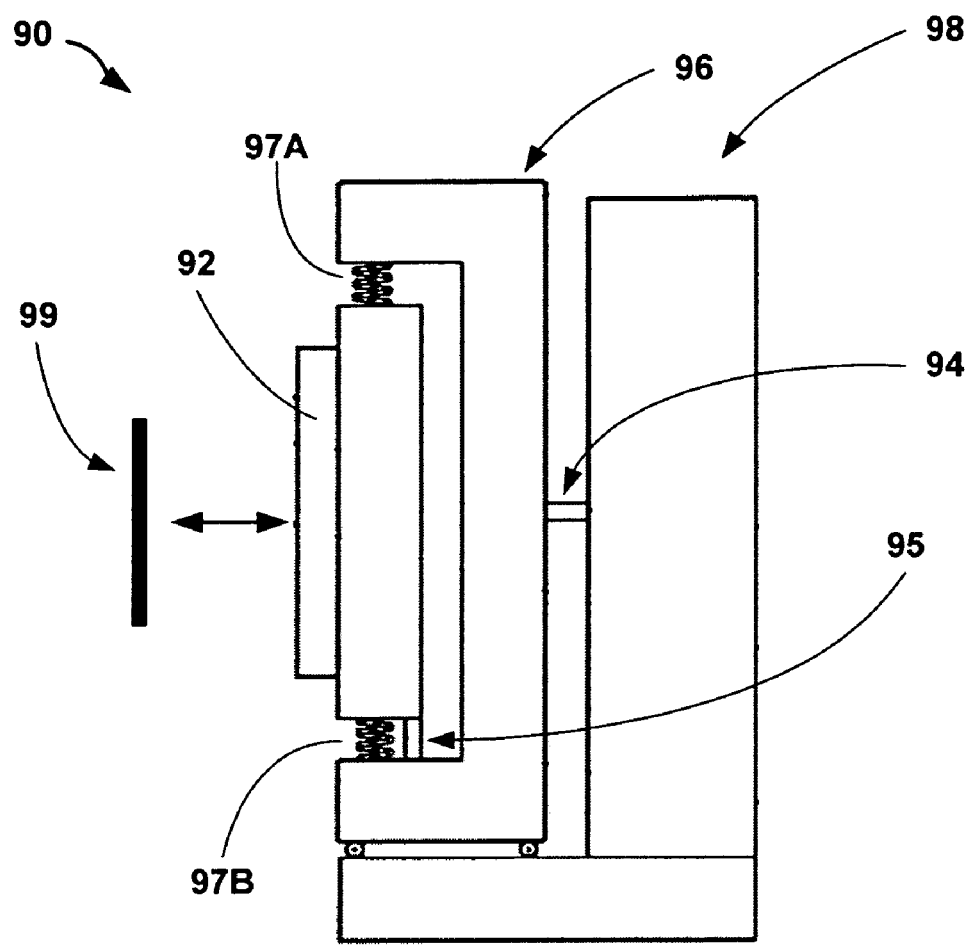
FIG. 7 is a schematic diagram illustrating an exemplary slider with an actuator for controlling the penetration position of the slider in accordance with an embodiment of the invention.

FIG. 7 is a side view of an exemplary linear data storage system 90 including an actuator 94 to control the transverse or penetration direction of a head assembly 92 relative to magnetic tape 96. Actuator 94 is located behind head assembly 92 and, more particularly, between support structure 98 and slider 96. Actuator 94 controls head-to-tape spacing by moving head assembly 92 toward or away from magnetic tape 99. Slider 96 includes actuator 95 and springs 97A and 97B (herein "springs 97") to control the vertical position of head assembly 92. Consequently, the entire structure of slider 96, including actuator 95 and springs 97, moves closer to or further from magnetic tape 99 when actuator 94 operates. Again, actuator 94 may comprise any of the previously described actuators.

In the illustrated example of FIG. 7, head 92 is spaced a distance away from tape 99. In some embodiments, however, tape 99 can be penetrated into head 92, i.e., tape 99 can be wrapped around head 92. In either case, system 90 includes a spacing feedback system that controls actuator 94 to make adjustments to the transverse position of head 92.

Figure 8A:
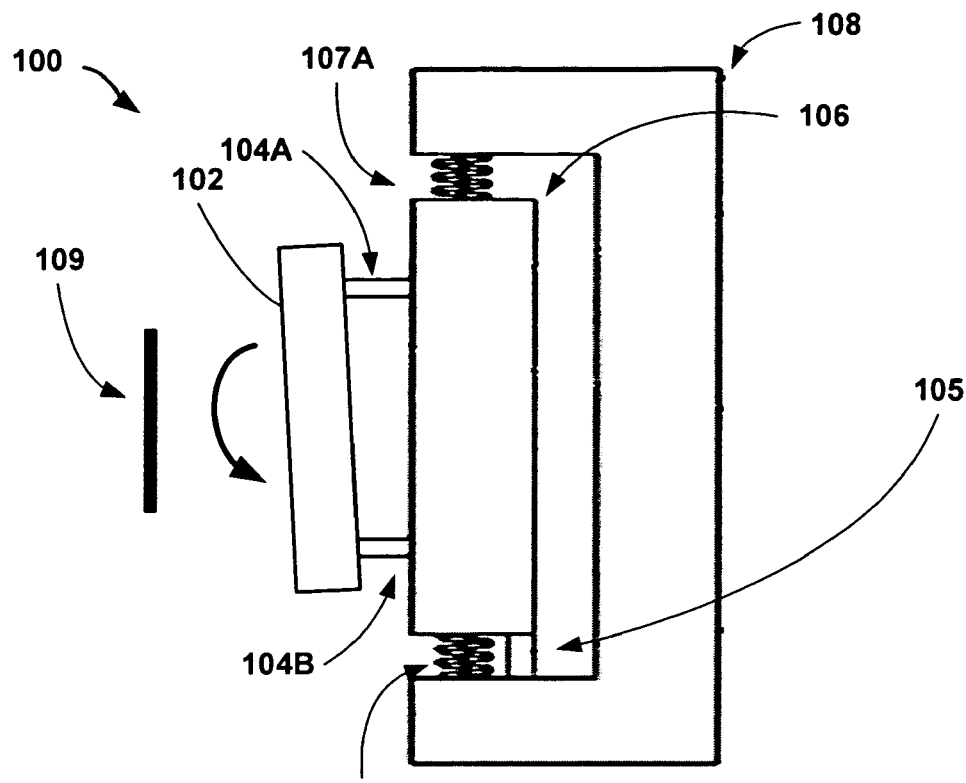
FIGS. 8A, 8B, 9, and 10 are schematic diagrams illustrating an exemplary slider and actuators for controlling the penetration and zenith positions of the slider in accordance with an embodiment of the invention.
Figure 8B:
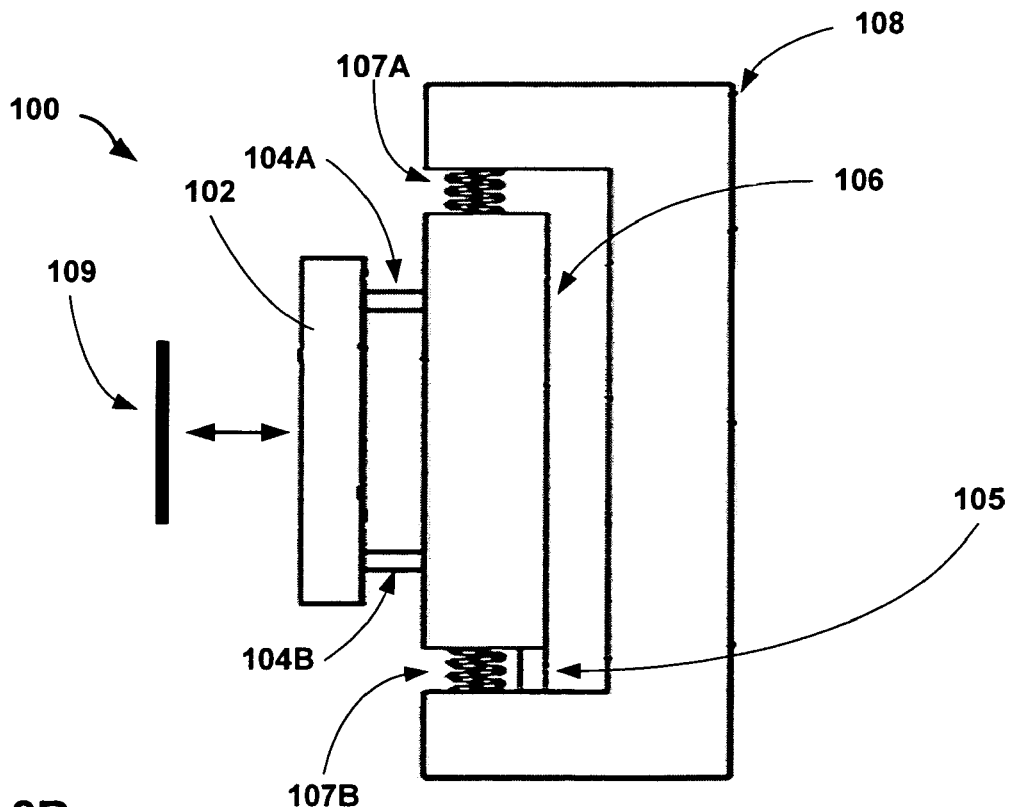

FIGS. 8A and 8B are side views illustrating an exemplary linear data storage system 100 including actuators 104A and 104B (herein "actuators 104") that control the transverse or penetration position and the zenith position of head assembly 102 relative to magnetic tape 109. In particular, FIG. 8A illustrates actuators 104 operating to control the zenith position of head assembly 102 and FIG. 8B illustrates actuators 104 operating to control the penetration position of head assembly 102. In each case, actuators 104 are mounted behind head assembly 102 and, more particularly, between head assembly 102 and slider 106. Head assembly 102 also includes actuator 105 and springs 107A and 107B (herein springs 107) to assist in controlling the vertical position. Thus, actuators 104 move as actuator 105 moves head assembly 102 to follow servo tracks on magnetic tape 109. Actuator 105 and springs 107 are mounted to slider 106 and support structure 108.

Actuators 104 may operate in a coordinated manner to adjust the penetration or zenith position of head assembly 102. In order to adjust the penetration position of head assembly 102, for example, actuators 104 may both move head assembly 102 the same distance, as shown in FIG. 8B. However, as shown in FIG. 8A, only one of actuators 104 may move head assembly 102 a given distance in order to adjust the zenith position. Alternatively, actuators 104 may work in opposition to each other to adjust the zenith position of head assembly 102. In other words, one of actuators 104 may move head assembly 102 in one direction and the other one of actuators 104 may move head assembly 102 in the opposite direction. In this manner, actuators 104 can control the zenith position, i.e., rotation of head assembly 102 about the x-axis (from the 3D Cartesian coordinate system of FIG. 1), i.e., about the long axis of magnetic tape 109.

Figure 9:
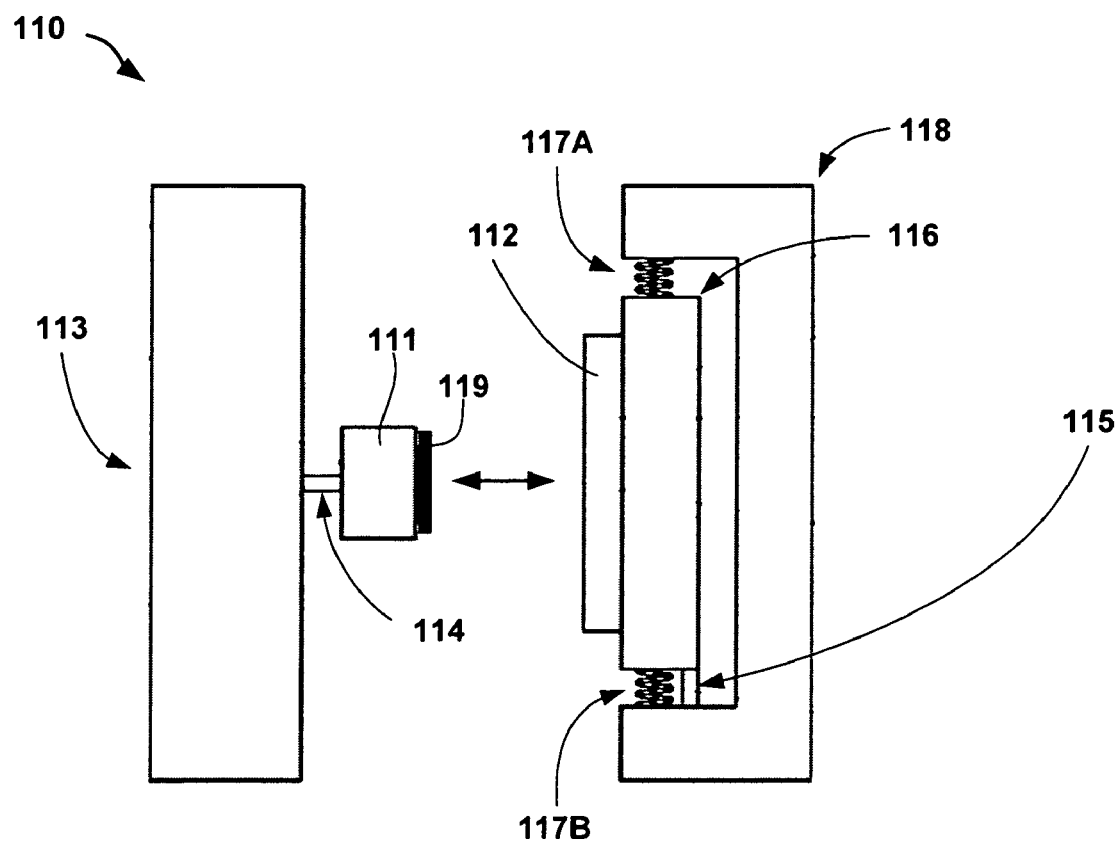

FIG. 9 is a schematic diagram illustrating an exemplary linear data storage system 110 including actuator 114 to control the penetration of magnetic tape 119 relative to head assembly 112. System 110 includes backplane 111. In operation, magnetic tape 119 moves across backplane 111 which sandwiches magnetic tape 119 between itself and head assembly 112 to stabilize and control magnetic tape 119. Actuator 114 is positioned behind backplane 111 and, more particularly, between support 113 and backplane 111. Thus, actuator 114 controls the spacing between head assembly 112 and magnetic tape 119 by positioning backplane 111 closer to and away from head assembly 112.

As shown in FIG. 9, system 110 also includes support structure 118 and slider 116 to provide support for head assembly 112. Slider 116 includes actuator 115 and springs 117A and 117B (herein "springs 117") to control the vertical position of head assembly 112.

Figure 10:
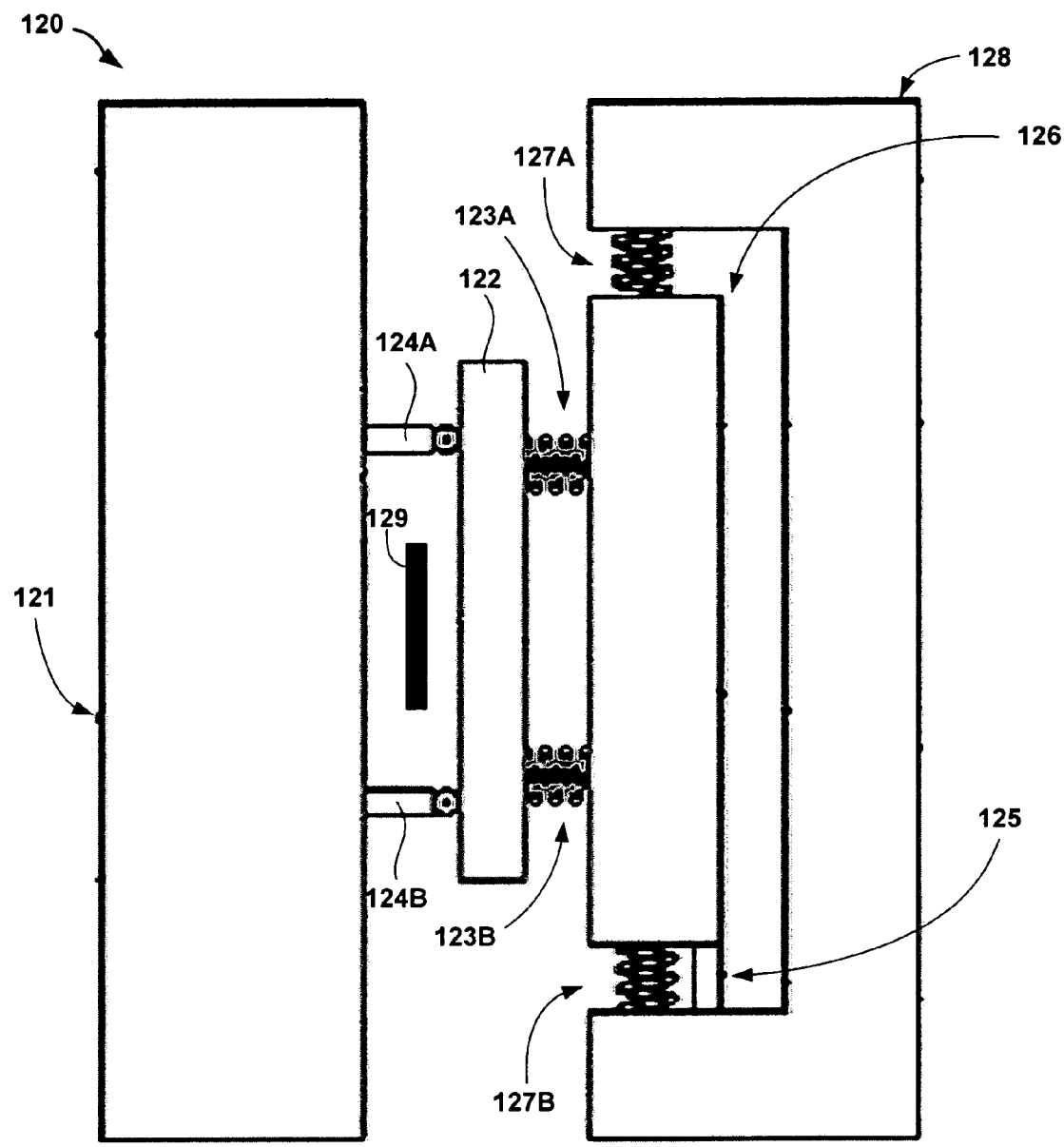

FIG. 10 is a schematic diagram illustrating an exemplary linear data storage system 120 including actuators 124A and 124B (herein "actuators 124") that control the penetration and zenith positions of head assembly 122. Actuators 124 are positioned between head assembly 122 and support structure 121 and above and below magnetic tape 129. Springs 123A and 123B (here springs 123) are positioned between head assembly 122 and slider 126. Thus, actuators 124 control the positioning of head assembly 122 as magnetic tape 129 passes between head assembly 122 and support structure 121. As previously described with respect to FIGS. 8A and 8B, actuators 124 may operate in a coordinated fashion to adjust the penetration or zenith position of head assembly 122.

System 120, as shown in FIG. 10, also includes support structure 128 and slider 126 to provide support for head assembly 122. Slider 126 includes actuator 125 and springs 127A and 127B (herein "springs 127") to control the vertical position of head assembly 122. In some embodiments, actuators 124 may include an additional actuator, such as actuator 94 of FIG. 7. In such embodiments, actuator 94 may act as a coarse positioning element and actuators 124 may act as fine positioning elements.

Figure 11:
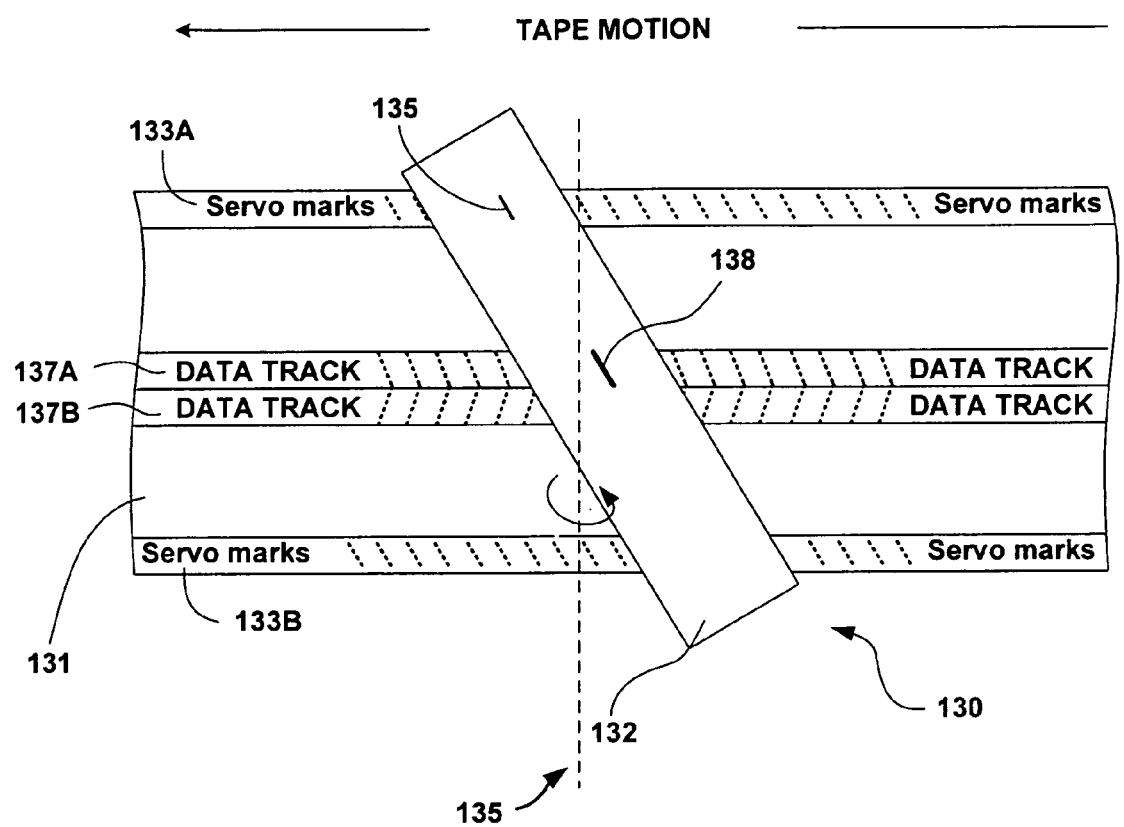
FIG. 11 is a conceptual diagram illustrating the system with a slider that is misaligned with a data track on the magnetic tape.

FIG. 11 is a conceptual diagram illustrating a read-while-write system 130 with data recorded to magnetic tape 131 using an azimuth recording technique. As shown in FIG. 11, magnetic transitions of data tracks 137A and 137B are recorded at a same but opposite angle relative to the direction of tape motion. Although not shown in FIG. 11, data tracks may extend across the width of magnetic tape 131 with magnetic transitions on alternate adjacent tracks recorded at a same but opposite angle relative to the direction of tape motion.

Slider 132 is positioned such that head element 138 and servo element 135 are aligned with the magnetic transitions of data track 137A and servo marks 133A. For clarity, only a single slider is shown in FIG. 11. However, another slider that is aligned with the magnetic transitions of data track 137B is typically included in system 130. Again, a slider used in systems utilizing an azimuth recording technique generally carries read elements and associated servo elements as well as write elements and associated servo elements. In the interest of clarity, FIG. 11 illustrates a single head element 138 and an associated servo element 135.

In operation, as magnetic tape 131 moves past slider 132, head element 138 reads magnetic transitions of data track 137A or writes data transitions of data track 137A. In particular, system 130 may require a very small penetration of the head carried by slider 132 with magnetic tape 131. However, because slider 132 is aligned with magnetic transitions of data track 137A, the yaw component of the position of slider 132 may affect the ability of slider 132 to reliably read and write data to magnetic tape 131. Again, the yaw position of slider 132 is defined as the rotation of slider 132 about the vertical axis of the 3D Cartesian coordinate system of FIG. 1. This axis is illustrated in FIG. 11 for reference. When slider 132 rotates about axis 135, head elements (not shown) located at opposite ends of slider 132 may be located closer to or further from magnetic tape 131. As an example, when slider 132 is misaligned with respect to the yaw position, head elements and servo elements at one end of slider 132 may be closer to magnetic tape 131 than the head elements and servo elements at the opposite end of slider 132. Thus, the signal noise will increase for elements on one end of slider 132 and decrease for elements on the opposite end of slider 132. The position of slider 132 has zero yaw when the response for each head is the same or balanced.

Figure 12:
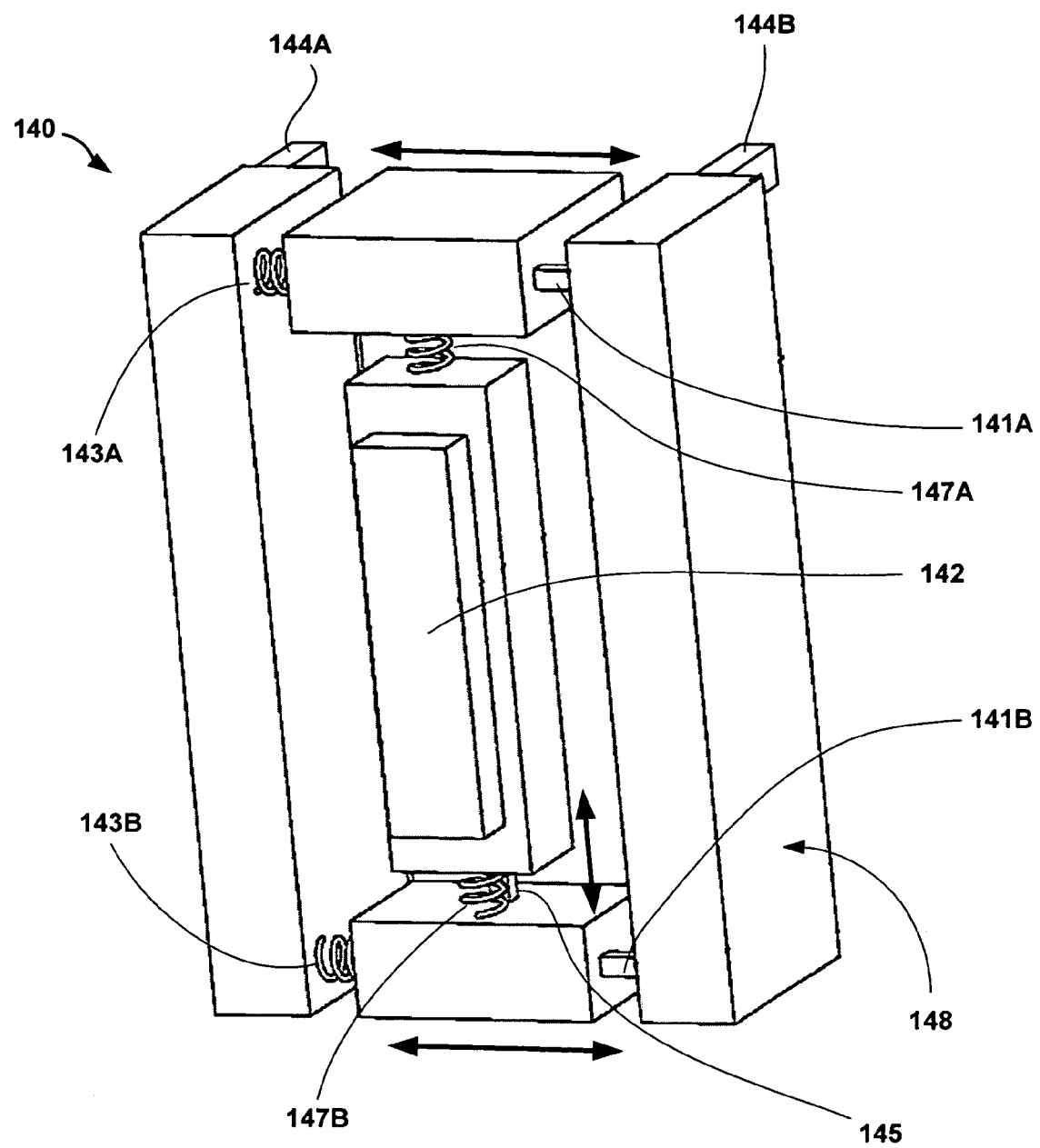
FIG. 12 is a schematic diagram illustrating an exemplary slider with actuators for controlling the yaw position of the slider in accordance with an embodiment of the invention.

Notably, the yaw position typically is not normally controlled in linear data storage systems using orthogonal recording techniques because a misalignment in the yaw position affects each element of the slider equally. However, the invention can allow for adjustments to the yaw component of the position of the slider. For example, the invention may provide two or more actuators operating in a coordinated fashion to control the yaw position of the slider. A feedback system may be provided for controlling the yaw position. FIG. 12 illustrates an example system that provides yaw position control.

FIG. 12 is a schematic diagram illustrating an exemplary slider 140 for use in a read-while-write linear data storage system 140. Slider 140 includes actuators 144A and 144B (herein "actuators 144") that control the yaw position of head assembly 142, i.e., the rotation of slider 140 about the y-axis of 3D Cartesian coordinate system shown in FIG. 1. In FIG. 12, actuators 144 are strategically mounted to support structure 148 which supports head assembly 142.

Support structure 148 includes two vertical supports and two horizontal supports that form a frame around head assembly 142. A gap exists between each of the supports and head assembly 142. Located in the gaps are springs and actuators that control the vertical and horizontal positioning of head assembly 142. In particular, actuators 141A and 141B (herein "actuators 141") control the horizontal positioning of head assembly 142 and are located on one side of head assembly 142. In particular, actuators 141 are located above and below head assembly 142 and between one of the horizontal supports and each of the vertical supports, respectively. Springs 143A and 143B (herein "springs 143") are located opposite actuators 141, i.e., between the opposite horizontal support and the vertical supports. Actuators 141 and springs 143 control the horizontal and zenith positioning of head assembly 142.

Actuator 145 is located in the gap between one of vertical supports and head assembly 142. Springs 147A and 147B (herein "springs 147") are located between the vertical supports and on each side of head assembly 142. In this manner, actuator 145 and springs 147 control the vertical positioning of head assembly 142 similar to the systems illustrated in FIGS. 4 and 6-10.

FIGS. 13-15 illustrate exemplary control systems for adjusting the position of a head relative to the magnetic tape, i.e., quality of the head-to-media interface (HTMI). In accordance with the invention, the quality of the HTMI, i.e., the position of a head relative to the surface of magnetic tape, is controlled with multiple degrees of freedom. In particular, FIGS. 13-15 illustrate exemplary systems for head penetration control, head zenith control, and head yaw control.

The invention may use control systems well known in the art for tracking the location of data tracks and, thus, these control systems are not included in this disclosure. For example, the invention may use a servo controller to detect servo tracks and generate position error signals. The position error signals are used as feedback to adjust the lateral or vertical distance of read or write heads relative to the data tracks. Time-based servo patterns and amplitude-based servo patterns are common for magnetic tape.

FIG. 13 is a block diagram illustrating a control system 150 for head penetration control, i.e., controlling the spacing between a head and magnetic tape. As shown in FIGS. 7, 8A, 8B, and 10, actuators mounted to a slider or support features for the slider may provide adjustments to the penetration position of a head. In addition, one or more actuators may be mounted to a backplane, i.e., a surface over which magnetic tape travels, to control the spacing between the head and the magnetic tape, as shown in FIG. 9.

In general, head penetration control is achieved through the analysis of integrated spectral noise power supplied by a servo element on the gap line of a slider. The integrated spectral noise power magnitude is a function of the head position, the resulting HTMI, and tape noise read at the HTMI. To quantify the quality of the HTMI, control system 150 compares two regions of a servo head readback signal (SHRS) power spectrum to quantify the quality of the HTMI. For penetration control, the first region is defined by low pass filtering the SHRS (LPFSHRS) and the other region is defined by high pass filtering the SHRS (HPFSHRS).

When the head is out of contact with the tape, LPFSHRS power is approximately equivalent to HPFSHRS power. As the head is positioned closer to the magnetic tape, i.e., the spacing between the head and the magnetic tape is reduced, an interface begins to form and is indicated by the LPFSHRS power climbing at a rate greater than HPFSHRS power. As penetration continues, the HTMI fully forms, and LPFSHRS power maximizes at a level much greater than HPFSHRS. FIG. 16A illustrates a graph showing the difference signal versus the head position.

As shown in FIG. 13, control system 150 includes amplifier 151, low pass filter 152, high pass filter 154, difference amplifier 156, analog-to-digital converter (ADC) 158, memory 155, and control logic 159. Amplifier 151 amplifies the output of the servo element, i.e., the servo head readback signal (SHRS). For example, amplifier 151 may output the SHRS by a nominal amount, such as 37 dBm. Low pass filter 152 and high pass filter 154 filter the output of amplifier 151 at 1 MHz and 5 MHz, respectively. The outputs of low pass filter 152 and high pass filter 154 are input into difference amplifier 156 that outputs a difference signal proportional to the established HTMI. ADC 158 samples the output of difference amplifier 156 at a predetermined rate. Control logic 159 compares the sampled difference signal output by ADC 158 with a predefined-signature for an exemplary HTMI tape noise difference signal. For example, control logic 159 may compare the output of ADC 158 to the predefined signature to determine the quality of the HTMI. FIG. 16A illustrates a graph that shows a plot of an exemplary difference signal versus decreasing spacing between the head and the magnetic tape.

In the illustrated example, the predefined signature is stored in memory 155 and compared to the output of ADC 158 on a bit-by-bit basis. However, in some embodiments, the predefined signature may be stored at consecutive memory addresses with a memory such that more than one bit is stored per memory address. Thus, it is understood that storing consecutive bits of the noise signature is merely one embodiment of the invention. In any case, control logic 159 controls one or more actuators to adjust the penetration position of the head, i.e., the spacing between the head and the magnetic tape, based on the output of difference amplifier 158.

The illustrated components of control system 150 may be implemented within one or more DSPs, microprocessors, application specific integrated circuits (ASICs), field programmable gate array (FPGAs), or any other equivalent integrated or discrete logic circuitry, as well as any combination of such components.

FIG. 14 is a block diagram illustrating a control system 160 for head zenith control. FIGS. 8 and 10 illustrate exemplary sliders with actuators for controlling head zenith control. In general, head zenith control is achieved through dynamic comparison of integrated spectral noise power of a SHRS supplied by two servo elements on opposite ends of a head gap line. This SHRS is a function of the head zenith positioning, the HTMI at each of the servo elements, and the tape noise being read at the particular HTMI. The quality of the HTMI is quantified by comparing the integrated noise power of LPFSHRS for a first servo element and a LPFSHRS for a second servo element. Importantly, this comparison is not initiated until head penetration control has been resolved, i.e., control system 150 has completed.

FIG. 14 illustrates control system 160 as including amplifiers 161 and 171, low pass filters 162 and 172, difference amplifier 166, ADC 168, and control logic 169. Amplifiers 161 and 171 amplify the output of two servo elements, SHRS, on opposite ends of the head gap line. As previously described with respect to FIG. 13, amplifiers 161 and 171 may amplify the SHRS for the corresponding servo elements. Low pass filters 162 and 172 may each filter the corresponding amplified SHRS at, for example, 1 MHz. Difference amplifier 166 generates a difference signal proportional to the established HTMI based on the output of low pass filters 162 and 172. ADC 168 samples the output of difference amplifier 166 and control logic 169 balances the LPFSHRS for each of the servo sensors by controlling actuators to adjust the zenith and penetration positions of the head.

In particular, as zenith angular displacement moves in the positive direction, the difference signal output by difference amplifier 166, as the HTMI represented by LPFSHRS of the other servo sensor, deteriorates. Additionally, if the angular displacement moves sufficiently far in the positive direction, the LPFSHRS of the first servo element will also deteriorate because the servo element is substantially misaligned with the servo track. In contrast, moving from a balance point, i.e., an aligned point, in a negative zenith angular displacement direction, the difference signal will favor the LPFSHRS of the second servo element as the HTMI represented by the LPFSHRS of the first element deteriorates. Again, the LPFSHRS of the second servo element will deteriorate when the head is not aligned with the magnetic tape.

The illustrated components of control system 160 may be implemented within one or more DSPs, microprocessors, application specific integrated circuits (ASICs), field programmable gate array (FPGAs), or any other equivalent integrated or discrete logic circuitry, as well as any combination of such components.

FIG. 15 is a block diagram illustrating a control system 180 for head yaw control. FIG. 12 illustrates an exemplary slider with actuators for head yaw control. In general, head yaw control is achieved through the dynamic comparison of integrated spectral noise power supplied by two servo sensors or elements, i.e., a first and a second servo element, on opposite ends of the head gap line. As previously described, head yaw control may be particularly useful for systems with data recorded using azimuth recording techniques. Head yaw control may also be useful for systems with flat head contours which are not overwrapped by the tape, such as in orthagonal recording systems. Accordingly, the first and second servo sensors may be located on opposite ends of the slider. Importantly, control system 180 controls the head yaw position only after the head penetration position and head zenith position have been adjusted.

Again, the integrated spectral noise power magnitude of the SHRS for each of the servo sensors can be a function of the head yaw actuation, the resultant HTMI at each of the servo sensors, and the tape noise read at that HTMI. By monitoring the difference of the LPFSHRS for the first and second servo sensors, yaw induced HTMI effects can be reduced. Control system 180 may operate within maximum yaw displacement limits in order to prevent overwrapping and damaging the magnetic tape. Notably, the functional relationship of the difference signal versus the yaw displacement function is similar to the relationship for head zenith control. Thus, control system 180 comprises substantially the same components as control system 160. In some embodiments, a single control system may perform the operations for head zenith control and head yaw control because head yaw control is performed after head penetration control and head zenith control. However, the invention is not limited as such. Rather, a head may be adjusted for each degree of freedom in any order or, in some cases, each degree of freedom may be performed substantially in parallel. In such embodiments, a dedicated control system may be required for each degree of freedom.

In any case, FIG. 15 illustrates control system 180 including amplifiers 181 and 191, low pass filters 182 and 192, difference amplifier 186, ADC 188, and control logic 189. Amplifiers 181 and 191 amplify the output of two servo elements on opposite ends of the head gap line, i.e., amplify a SHRS output by a first and a second servo sensor, respectively. In this case, the head gap line is angled in order to align the head elements with the magnetic transitions recorded on the magnetic tape. Low pass filters 182 and 192 filter the SHRS for the first and second servo elements, respectively. As an example, low pass filters 182 and 192 may filter the SHRS at 1 MHz for each of the servo elements. Difference amplifier 186 generates a difference signal proportional to the established HTMI based on the output of low pass filters 182 and 192. ADC 188 samples the output of difference amplifier 186. Control logic 189 balances the LPFSHRS for each of the servo sensors by controlling actuators to adjust the yaw position of the head based on the sampled output of ADC 188.

The illustrated components of control system 180 may be implemented within one or more DSPs, microprocessors, application specific integrated circuits (ASICs), field programmable gate array (FPGAs), or any other equivalent integrated or discrete logic circuitry, as well as any combination of such components.

FIGS. 16A and 16B are block diagrams illustrating control systems for head azimuth control. In general, head azimuth control may be achieved by two modes, i.e., in a macro mode and in a micro mode. Importantly, for both the macro mode and the micro mode, head penetration control, dynamic head zenith control, and dynamic head yaw control must be established prior to performing head azimuth control.

In a macro mode, control system 200, shown in FIG. 16A, achieves head azimuth control by dynamically comparing servo signal power read by a single servo sensor when the servo sensor is locked onto a servo track. In particular, macro mode head azimuth control is a function of maximizing a LPFSHRS for a servo sensor. Accordingly, control system 200 includes an amplifier 201 that amplifies a SHRS for a servo sensor. The servo sensor may comprise one of the servo sensors used for head penetration control, head zenith control, and head yaw control. The amplified SHRS, i.e., the output of amplifier 201, is filtered by low pass filter 202 and sampled by ADC 208. Control logic 209 controls actuators to adjust the position of the head based on the output of ADC 208. In other words, control logic 209 dynamically adjusts the azimuth position of the head based on the magnitude of the received signal. For example, control logic 209 may cause actuators to adjust the azimuth position of the head in response to a decrease in the signal magnitude. If the azimuth position is not adjusted, the servo sensor will no longer be locked onto the servo track.

FIG. 16B shows control system 210 for achieving head azimuth control in a micro mode. In the micro mode head, azimuth control is achieved by measuring the zero crossing time differences between two servo sensors located on opposite ends of the head gap line. In this manner, control system 210 adjusts the head azimuth position based on the phase difference between LPFSHRS for servo sensors on opposite ends of the head gap line.

In the illustrated example, control system 210 includes amplifiers 211 and 213, low pass filters 212 and 214, processing circuitry 216, ADC 218, and control logic 219. Amplifiers 211 and 213 amplify a SHRS for a first servo sensor and a second servo sensor, respectively. As previously described, the first and second servo sensors are located on opposite ends of the head gap line. Low pass filters 212 and 214 filter the SHRS for the first and second servo sensors, respectively. Low pass filters 212 and 214 may, for example, filter the SHRS signals at 1 MHz for each of the servo sensors. Processing circuitry 216 measures the zero crossing timing difference between the LPFSHRS for the servo sensors, i.e., determines the phase difference between the LPFSHRS for the servo sensors. The signal generated by processing circuitry 216 is sampled by ADC 208. Control logic 209 controls actuators to adjust the azimuth position of the head based on the measured phase difference. Consequently, control system 210 prevents the head from losing a lock on a servo track by controlling the azimuth position of the head.

Figure 17A:
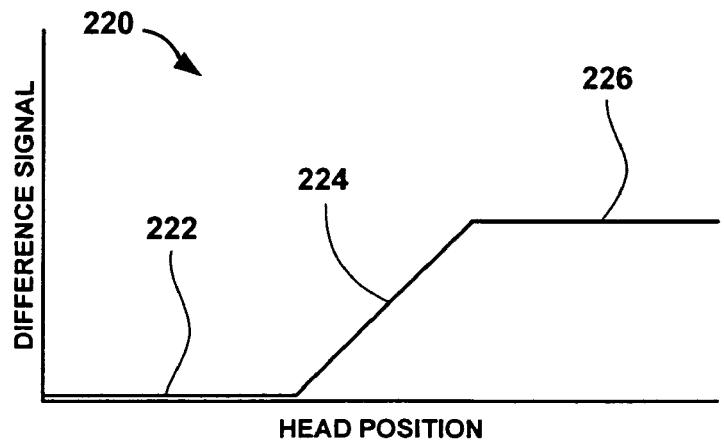
FIGS. 17A-17C are graphs illustrating signals used for controlling the position of a slider in accordance with an embodiment of the invention.
Figure 17B:
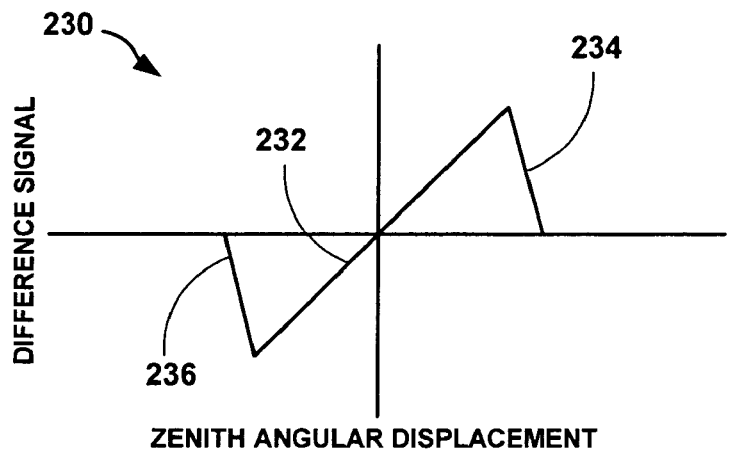
Figure 17C:
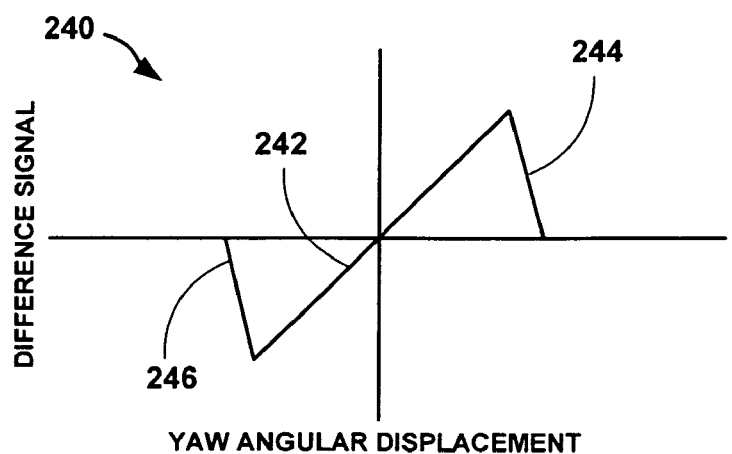

FIGS. 17A-17C are graphs illustrating exemplary control signals used for controlling a HTMI in accordance with an embodiment of the invention. The graph illustrated in FIG. 17A shows an exemplary control signal 220 generated by a head penetration control system, such as control system 150 (FIG. 13). Exemplary control signal 220 includes three distinct portions that each indicate different HTMI qualities. The first portion 222 corresponds to the head being out of contact with the tape. When this occurs, the LPFSHRS power is approximately equal to the HPFSHRS power. As the spacing between the head and the magnetic tape is decreased, the HTMI begins to form and the LPFSHRS power climbs at a rate greater than the HPFSHRS power. The second portion 224 indicates this "near contact" position. As penetration continues, the HTMI forms and the LPFSHRS power maximizes at a level much greater than the HPFSHRS power. Accordingly, this "full contact" head position is indicated by the third portion 226 of exemplary control signal 220.

FIG. 17B illustrates a graph showing an exemplary control signal 230 generated by a head zenith control system, such as control system 160 (FIG. 14). As previously described with respect to control system 160, exemplary control signal 230 is a function of the integrated noise power of the LPFSHRS for two servo sensors located on opposite ends of the head gap line. As shown, the difference signal will favor the LPFSHRS of the servo sensor located on one end of the head gap line as zenith angular displacement moves in the positive direction. Moving in the negative zenith angular displaced direction results in the difference signal favoring the LPFSHRS of the servo sensor located on the opposite end of the head gap line. This trade off is indicated by portion 232 of control signal 230. However, when the zenith angular displacement moves past balanced portion 232 in either direction, the LPFSHRS for each of the servo sensors deteriorates towards zero. These portions are indicated by an extreme positive portion 234 and an extreme negative portion 236.

FIG. 17C illustrates a graph showing an exemplary control signal 240 generated by a head yaw control system 180, such as control system 180 (FIG. 15). Control signal 240 is generated by comparing integrated spectral noise power supplied by servo sensors located on opposite ends of the head gap line. Again, head yaw control is particularly useful for systems using azimuth recording techniques and may also be useful for systems with flat head contours which are not overwrapped by the tape. Thus, the head gap line is at an angle relative to the direction of tape motion and, more particularly, aligned with the data transitions recorded on the magnetic tape.

The relationship of the difference signal with changing yaw position is similar to the zenith displacement function described with respect to FIG. 17B. For example, control signal 240 includes a balanced portion 242, an extreme positive portion 244, and an extreme negative portion 246. Balanced portion 242 is indicated by the increase in the LPFSHRS of one of the servo sensors as the yaw position changes in one direction and an increase in the LPFSHRS of the other servo sensor as the yaw position changes in the opposite direction. The positive extreme portion 244 is indicated by the decrease in the LPFSHRS of both servo sensors as the yaw position changes in the position direction. The negative extreme portion 246 is indicated by the decrease in the LPFSHRS of both servo sensors as the yaw position changes in the negative direction.

Figure 18:
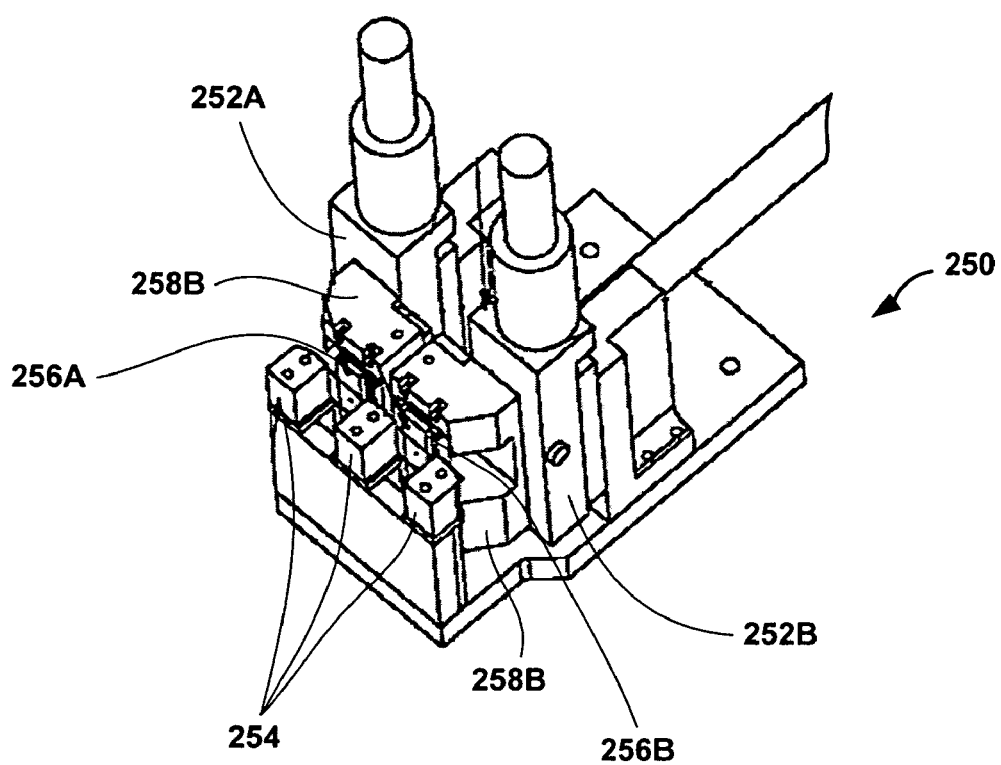
FIG. 18 is a schematic diagram illustrating a nest structure that holds sliders and tape locating components.

FIG. 18 is a schematic diagram illustrating a nest structure or assembly 250 for holding tape that holds head positioning and tape locating components. As shown in FIG. 18, nest assembly 250 includes tape guides 254, head assemblies 256A and 256B, fine positioner supports 258A and 258B, and coarse positioners 252A and 252B. Although not explicitly shown in FIG. 18, actuators that control the position of head assemblies 256A and 256B with multiple degrees of freedom are carried by nest assembly 250. Specifically, actuators are not shown in FIG. 18 for purposes of clarity. However, actuators may be mounted to head assemblies 256A and 256B or features that support head assemblies 256A and 256B as broadly described in this disclosure.

By packaging the head positioning and tape locating components on nest assembly 250, the components can be aligned with high precision more easily than would be possible if the individual head positioning components and tape locating components were aligned independently of each other. In particular, it becomes increasingly difficult to align individual head positioning components with each other as track pitches become smaller. It also becomes increasingly important and more difficult to achieve head-to-tape alignment due to increasingly tight tolerances. Individual head component alignment issues and head-to-tape alignment issues may occur at very small track pitches, such as track pitches of approximately less than 5 microns, approximately less than 2 microns, or approximately less than 1 micron.

Tape guides 254 are used to locate magnetic tape relative to head assemblies 256A and 256B. In particular, tape guides may include a surface (not shown) that sandwiches the magnetic tape between itself and head assemblies 256A and 256B. As previously described, actuators may control the position of the surface relative to head assemblies 256A and 256B and, thus, control the penetration position.

Head assembly 256A may carry read elements for reading data from magnetic tape and servo elements for reading servo markings on the magnetic tape while head assembly 256B may carry write elements for writing data to magnetic tape and servo elements for reading servo markings on the magnetic tape. As previously described, carrying read elements and write elements on separate head assemblies may provide certain advantages. For example, at very small track pitches, such as track pitches of approximately less than 5 microns, approximately less than 2 microns, and approximately less than 1 micron, the alignment of read elements with write elements on a single slider becomes increasingly difficult or even impossible. The need to precisely align the read elements with the write elements on a given slider is avoided by carrying the read elements and write elements on separate head assemblies as alignment of the read elements with respect to the data tracks can be performed by servo tracking of one head assembly and alignment of the write elements with respect to the data tracks can be performed by servo tracking of the other head assembly. Actuators may be used to control the position of each head assembly independently with multiple degrees of freedom, as previously described in this disclosure.

Fine positioner supports 258A and 258B provide support for head assemblies 256A and 256B, respectively. Actuators that control the position of head assemblies 256A and 256B with multiple degrees of freedom may be mounted to fine positioner supports 258A and 258B as broadly described in this disclosure. For example, FIGS. 4, 6-10, and 12 illustrate various arrangements for mounting actuators to control the position of a head assembly with multiple degrees of freedom.

Coarse positioners 252A and 252B may be used to position head assemblies 256A and 256B, respectively, in general proximity to a desired location. In particular, coarse positioners 252A and 252B may be used to position head assemblies 256A and 256B in general proximity to magnetic tape, i.e., provide penetration control for head assemblies 256A and 256B. Typically, coarse positioners are not used to control the position of head assemblies in other directions, i.e., with other degrees of freedom, because the head assemblies are aligned relative to each other within nest assembly 250.

The nest assembly 250 illustrated in FIG. 18 is merely exemplary and should not be considered limiting of the invention as broadly described in this disclosure. For example, although tape guides 254 are illustrated in FIG. 18 as having three separate tape guides, tape guides 254 may comprise one or more tape guides. As another example, nest assembly 250 includes two head assemblies, i.e., head assembly 256A and 256B, but may include only one head assembly or more than two head assemblies. Nest assembly 250 may also carry the tape guides in such embodiments.

When nest assembly 250 includes a single head assembly, the head assembly may include both read and write elements as well as servo elements. In some embodiments, two or more nest assemblies, each comprising a head assembly including both read and write elements as well as servo elements, may be located on the same side of the magnetic tape or opposite sides of the magnetic tape. When nest assembly 250 includes two or more head assemblies, one head assembly may carry read elements and servo elements and the other head assembly may carry write elements and servo elements. In some embodiments, two such nest assemblies may be located on the same side of the magnetic tape or opposite sides of the magnetic tape. In additional embodiments, when a nest assembly holds two or more head assemblies, the head assemblies may be located on opposite sides of the magnetic tape.

As yet another example, nest assembly 250 may not include coarse positioners 252A and 252B. In such cases, coarse positioners 252A and 252B may be integrated with fine positioner supports 258A and 258B or may be attached to nest assembly 250 rather than carried by nest assembly 250. Accordingly, it is understood that nest assembly 250 may carry various configurations or arrangements of head and tape positioning elements.

Figure 19:
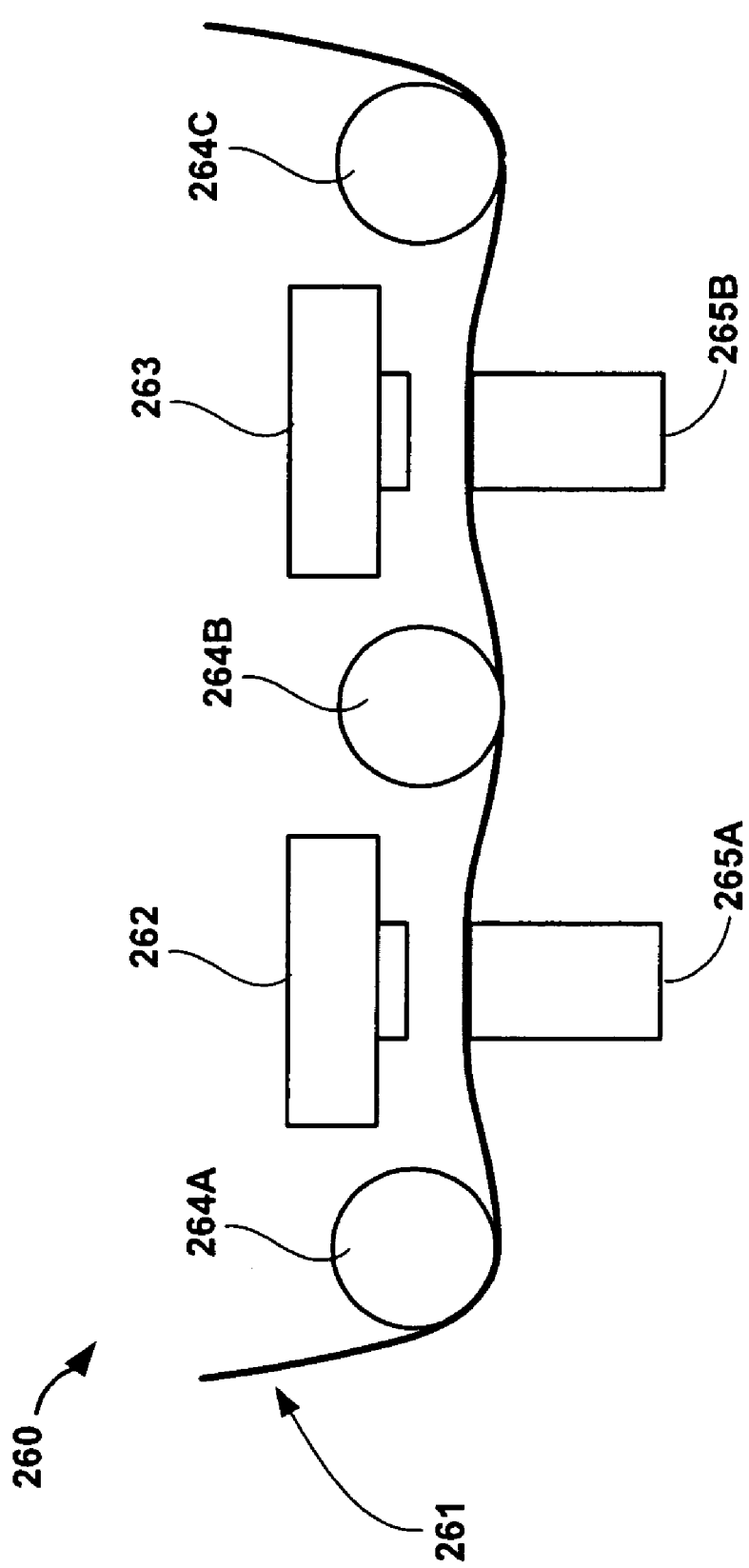
FIG. 19 is a conceptual diagram illustrating a magnetic tape storage system in accordance with an embodiment of the invention.

FIG. 19 is a conceptual diagram illustrating an exemplary magnetic tape storage system 260 that provides position control with multiple degrees of freedom for sliders 262, 263. In the illustrated example, slider 262 may carry write elements and servo elements while slider 263 may carry read elements and servo elements. Alternatively, each of sliders 262 and 263 may carry read elements and associated servo elements as well as write element and associated servo elements. In either case, system 260 provides multiple actuators (not shown) to adjust the position of sliders 262, 263 relative to the surface of magnetic tape 261 with multiple degrees of freedom. As previously described, system 260 may adjust the position of sliders 262, 263 based on the integrated power spectral noise power of servo signals received from sliders 262, 263.

In operation, tape guides 264A-264C control magnetic tape 261 as it travels past sliders 262, 263. In general, tape guides 264A-264C condition magnetic tape 261 for recording, i.e., tape guides 264A-264C may restrict magnetic tape 261 from moving in unwanted directions. System 260 also includes backplanes 265A, 265B. Magnetic tape 261 travels over backplanes 265A and 265B such that magnetic tape is sandwiched between backplanes 265A and 265B and sliders 262, 263, respectively. Thus, backplanes 265A and 265B may assist in stabilizing magnetic tape 261 and defining a space between sliders 262, 263 and magnetic tape 261.

Typically, guides are equipped with either flanges or conical surfaces or tilt to limit magnetic tape 261 from large lateral motion and to manage tape transport with or without edge contact. As shown, magnetic tape 261 is steered by guides 264A-264C to provide appropriate head-to-tape spacing with a minimal lateral motion. Lateral tape motion depends on many factors such as the guides' radius, surface finish, orientation, location, flange-to-flange distance (or conical slope), head-to tape spacing, and guides' friction. The design of tape guides 264A-264C may depend on the dimension of the track pitches. As track pitches become increasing smaller, such as less than approximately 5 microns, less than approximately 2 microns, and especially less than approximately 2 micron, it is important that tape guides 264A-264C condition magnetic tape 261 such that magnetic tape 261 is not moving when one of sliders 262, 263 glides across tape 261.

For this reason, tape guides 264A-264C may provide not only tape guiding and steering but also sufficient lateral friction to substantially prevent magnetic tape 261 from moving when sliders 262, 263 move across tape 261. Example head contour designs for tape guides 264A-264C include tape guides having a cylindrical surface and tape guides having flat heads with shallow cavities. In practice, the design of the tape guide may be selected based on tape properties and required spacing between the head and tape.

For such small track pitches, contoured tape guides may replace purely cylindrical guides. Contoured guides generate surface drag and reduce the lateral tape movement during servo action. The design of the middle tape guide in a dual actuator system, such as tape guide 264B, is particularly important to ensure that individual sliders 262, 263 move across magnetic tape 261 without dragging tape 261.

In addition, guides 264A-264C may be designed to move towards magnetic tape 261 tape individually or together by mounting guides 264A-264C on a nest assembly (shown in FIG. 18) to set appropriate wrap angles. Guides 264A-264C may also be designed to engage and disengage during tape loading and unloading. In some special cases, tape guides 264A-264C may disengage during the recording process. Further, system 260 may control the later motion and wrap angle of tape guides 264A-264C using a feedback control system.

FIGS. 20A-20D are conceptual diagrams illustrating various dual sided magnetic tape storage systems in accordance with an embodiment of the invention. Each of the systems illustrated in FIGS. 20A-20D provide position control with multiple degrees of freedom for each slider included in the system. The tape locating components, i.e., tape guides and backplanes, may be designed to condition the magnetic tape for recording, for example, by restricting lateral movement of the tape as described in FIG. 19. For clarity, only the sliders and tape locating components are shown for each of the systems illustrated in FIGS. 20A-20D. However, it is understood that each of the systems include additional elements which have been previously described. For example, each of the systems illustrated in FIGS. 20A-20D may include features to support the sliders and tape locating components.

Figure 20A:
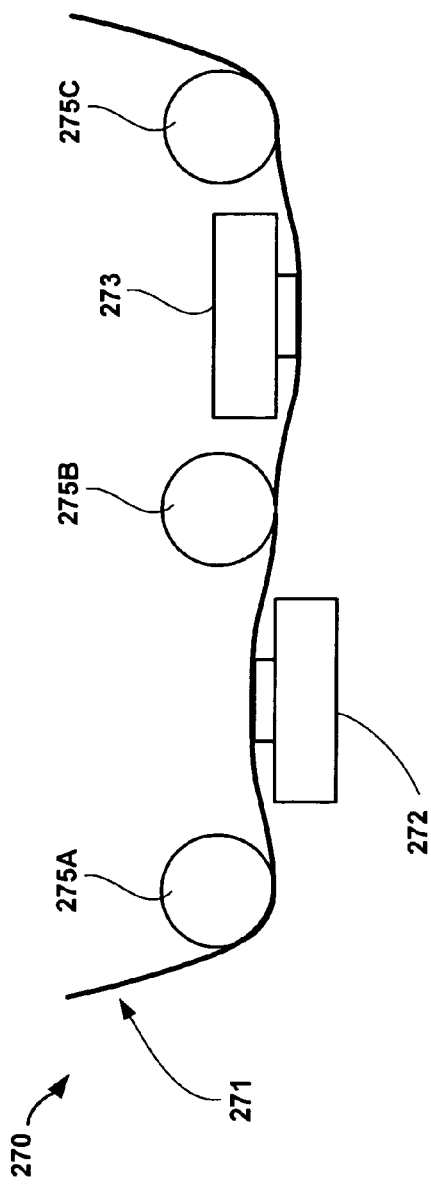
FIGS. 20A-20D are conceptual diagrams illustrating various dual sided magnetic tape storage systems in accordance with an embodiment of the invention.

In particular, FIG. 20A illustrates magnetic tape data storage system 270 having sliders 273 and 272 located on opposite sides of magnetic tape 271. Tape guides 275A-275C condition magnetic tape 271 for recording as tape 271 travels past sliders 272, 273. Sliders 272 and 273 are spaced apart from each other such that sliders 272 and 273 are not directly opposite each other. In this case, each of head assemblies 272, 273 includes both read and write elements as well as servo elements. Consequently, system 270 can read and write data to both sides of magnetic tape 271.

Figure 20B:
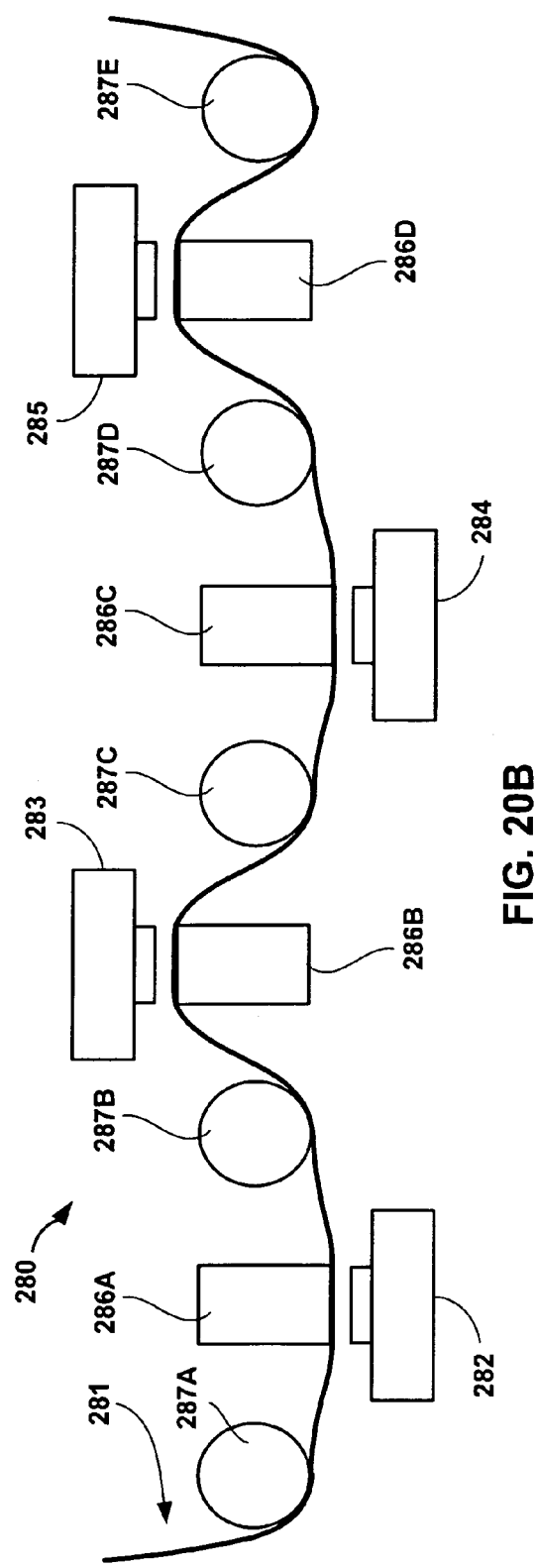

FIG. 20B illustrates another magnetic tape storage system 280 for dual sided data storage. Unlike system 270 in FIG. 20A, system 280 includes two sliders on each side of magnetic tape 281 for separately reading and writing data. For example, sliders 282 and 284 may include read elements and servo elements for reading data from opposite sides of magnetic tape 281 whereas sliders 283 and 285 may include write elements and servo elements for writing data to opposite sides of magnetic tape 281. Sliders 282-285 are spaced apart from one another in a staggered configuration such that no two sliders are positioned opposite each other. In this manner, sliders 282, 283 and sliders 284, 285 operate in a coordinated fashion to read and write data to magnetic tape 281.

System 280 includes tape guides 287A-287E and backplanes 286A-286D to condition magnetic tape 281 as tape 281 travels past sliders 282-285. Backplanes 286A-286D provide additional stability for tape 281 and may also assist in controlling the space between sliders 282-285 and magnetic tape 281.

System 280 may provide particular advantages over system 270 at very small track pitches, such as track pitches of approximately 1 micron, and especially less than 1 micron, because it becomes very difficult or even impossible to align read and write elements with each other on a single slider. In other words, the system illustrated in FIG. 18B may more reliably read and write data to magnetic tape 281 by controlling the HTMI for each of sliders 282-285 with multiple degrees of freedom.

Figure 20C:
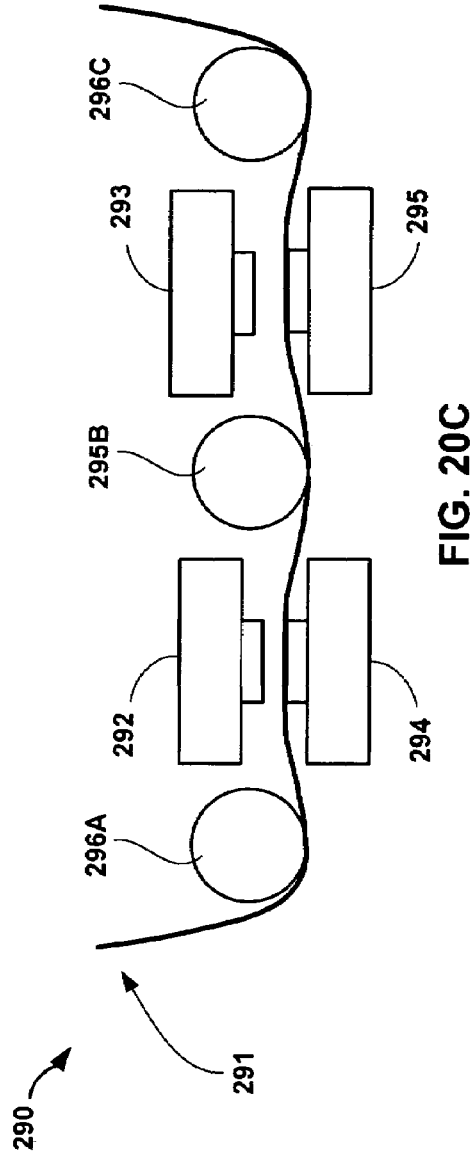

FIG. 20C illustrates yet another magnetic tape storage system 290 for dual sided data storage. In FIG. 20C, read and write elements are carried by separate sliders on each side of magnetic tape 291. For example, sliders 292 and 294 may carry read elements for reading data from opposite sides of tape 291 and sliders 293 and 295 may carry write elements for writing data to opposite sides of tape 291. In contrast to system 280 (FIG. 20B), sliders for read and writing data to respective sides of tape 291 are located directly opposite each other. Tape guides 296A-296C condition magnetic tape 291 as it travels past sliders 292-295.

Figure 20D:
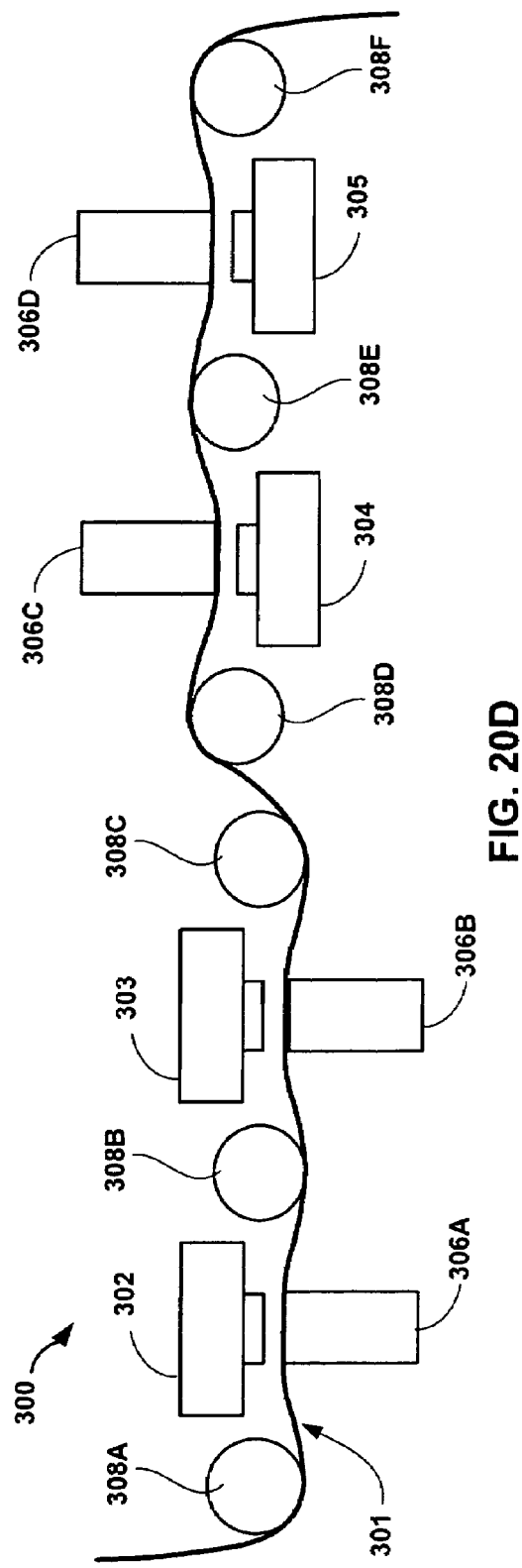

FIG. 20D illustrates a further magnetic tape data storage system 300 for dual sided data storage. System 300 includes separate sliders for reading and writing data to respective sides of magnetic tape 301. For example, sliders 302 and 304 may include write elements for write data to opposite sides of magnetic tape 301 and sliders 303 and 305 may include read elements for reading data on opposite sides of magnetic tape 301. Sliders 302-305 are spaced apart from one another such that no sliders are positioned directly opposite of each other. In particular, sliders 302 and 303 are located adjacent to each other and operate in a coordinated manner to read and write data to magnetic tape 301. Sliders 304 and 305 are also located adjacent to each other and operate in a coordinated manner to read and write data to magnetic tape 301.

Tape guides 308E-308F condition magnetic tape 301 as it travels past sliders 302-305 and backplanes 306A-306D provide additional stability for tape 301. Backplanes 306A-306D may also assist in controlling the space between sliders 302-305 and magnetic tape 281.

Figure 21:
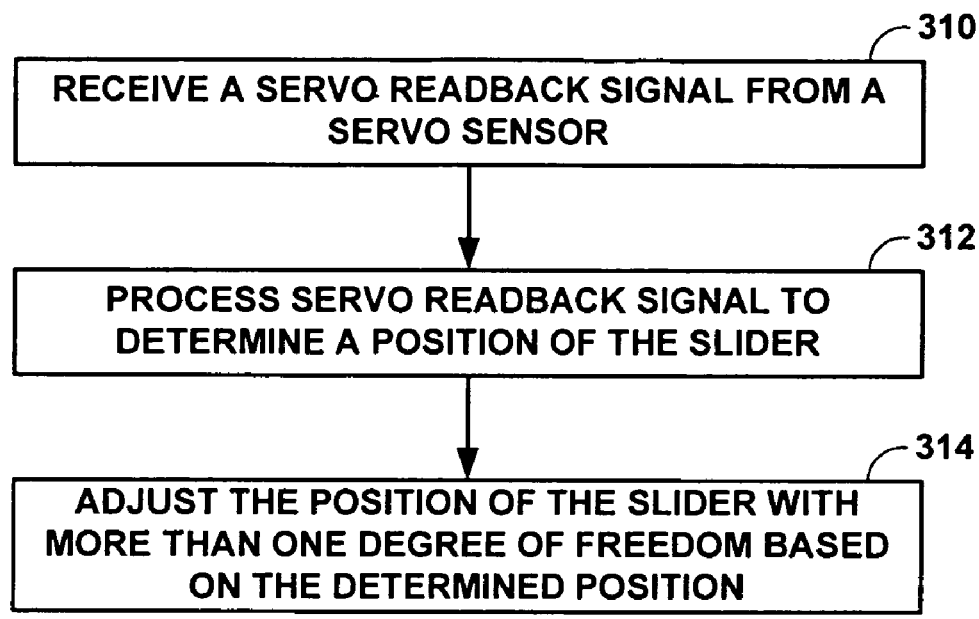
FIG. 21 is a flowchart illustrating operation of a system for controlling the position of a slider relative to a data storage medium with multiple degrees of freedom.

FIG. 21 is a flowchart illustrating operation of an exemplary magnetic data storage system for controlling the position of a slider with multiple degrees of freedom in accordance with an embodiment of the invention. Although multiple magnetic tape storage systems have been described in this disclosure, such as systems with read and write elements carried on a single slider, systems with read and write elements carried on separate sliders, and systems with various configurations for dual sided data storage, FIG. 21 will be described with reference to system 10 of FIG. 1. However, it is understood that the steps of the flowchart in FIG. 21 may be applied to any of the magnetic data storage systems described in this disclosure to control the position of a slider with multiple degrees of freedom. For example, the steps of FIG. 21 may be used to control the position of each slider in a system employing more than one slider to read and write data to magnetic tape.

Initially, system 10 receives a servo readback signal from a servo sensor (310), also referred to herein as a servo element. For example, the servo readback signal may be received from first slider 12 that includes write element 14 and servo elements 15A and 15B or second slider 16 that includes read element 18 and servo elements 19A and 19B. For clarity, FIG. 21 will be described with respect to first slider 12. In particular, system 10 may receive a single servo readback signal or more than one servo readback signal based on the degree of freedom that is being controlled. For example, a single servo readback signal is required for head penetration control, as described in FIG. 13, and head azimuth control, as described in FIG. 16. However, servo readback signals from two servo sensors located at opposite ends of the head gap line are required for head zenith control (FIG. 14) and head yaw control (FIG. 15). Thus, system 10 may receive a servo read back signal from one of servo elements 15A and 15B or from both servo elements 15A and 15B.

System 10 may then process the servo readback signal or signals to determine a position of slider 12 (312). As previously described the integrated spectral noise power magnitude of the servo readback signal is a function of the head position, the resulting head-to-tape media interface (HTMI), and tape noise read at the HTMI. Thus, system 10 processes the power spectrum of a single servo readback signal or the power spectrum of two servo readback signals to determine the position of slider 12.

Using head penetration control and FIG. 13 as an example, system 10 processes the servo readback signal by applying a low pass filter and a high pass filter and determines the penetration position of slider 12 by comparing the magnitude of the resulting signals. The relationship of the difference signal generated by comparing the magnitude of the resulting signals with varying penetration position is illustrated in FIG. 17A.

As another example, system 10 may determine the zenith and yaw position of slider 12 by low pass filtering servo readback signals received from servo elements 19A and 19B and comparing the magnitude of the resulting signals. FIG. 17B illustrates the relationship of the difference signal generated by comparing the magnitude of the resulting signals with varying zenith angular displacement. FIG. 17C illustrates the relationship of the difference signal generated by comparing the magnitude of the resulting signals with varying yaw angular displacement. In this manner, system 10 processes the power spectrum of two servo readback signals to determine the zenith and yaw position of slider 12. Again, determining the yaw position of slider 12 is particularly useful when system 10 employs an azimuth recording technique for recording data to magnetic tape 21 and may also be useful for systems with flat head contours which are not overwrapped by the tape.

For head azimuth control, system 10 may process a servo readback signal in one of two modes to determine the position of slider 12. In a macro mode, system 10 may process the magnitude of the servo readback signal after the servo element has been locked onto a servo track. In a micro mode, system 10 determines the position of slider 12 by measuring the zero crossing time difference of two received servo readback signals.

After determining the position of slider 12, system 10 adjusts the position of slider 12 with more than one degree of freedom based on the determined position (314), i.e., the position determined by processing the servo readback signal or signals. In particular, system 10 includes multiple actuators for controlling the position of slider 12. The actuators may be mounted to slider 12 or features that support slider 12. FIGS. 4, 6-10, and 12 illustrate exemplary sliders including actuators for controlling the position with multiple degrees of freedom. For example, slider 12 may include an actuator to control the vertical position, two actuators operating in a coordinated fashion to control the penetration and zenith positions, two actuators operating in a coordinated fashion to control the horizontal and azimuth positions, and two actuators operating in a coordinated fashion to control the yaw position.

Importantly, FIG. 21 illustrates exemplary operation of system 10 to control the position of slider 12 with one degree of freedom. In other words, FIG. 21 may be used to control the position of slider 12 with one degree of freedom. In order to control the position of slider 12 with multiple degrees of freedom, the steps of FIG. 21 may be repeated for each degree of freedom or, in some cases, may be performed in parallel. However, since a relationship exists between the degrees of freedom, performing the steps of FIG. 21 for each degree of freedom in an ordered sequence may provide certain advantages. In particular, performing the steps of FIG. 21 separately for each degree of freedom, e.g., in an ordered manner, may simplify control logic and circuitry since the same processing and control circuitry may be used for more than one degree of freedom, as evidenced by control systems illustrated in FIGS. 13, 14, 15, 16A, and 16B.

Various embodiments of the invention have been described. Although various embodiments of the invention have been described in this disclosure with respect to magnetic tape, the invention is not so limited. Rather, the invention may also be applied to other systems using other linear data storage media, such as magneto-optic tape, optical tape, holographic tape, and possibly other tape-like media formats. These and other embodiments are within the scope of the following claims.

The invention claimed is:

1. An apparatus for use in a linear data storage system comprising:
    a slider including at least one of one or more read elements to read data from a linear data storage medium and one or more write elements to write data to the linear data storage medium, and one or more servo elements to read servo marks from the linear data storage medium; and
    multiple actuators to define a position of the slider relative to a surface of the linear data storage medium with multiple degrees of freedom.

2. The apparatus of claim 1, wherein the multiple degrees of freedom include two or more of a vertical position, a horizontal position, a transverse position, a zenith position, an azimuth position, and a yaw position of the slider relative to the surface of the linear data storage medium, wherein the position of the slider is defined in accordance with a three-dimensional (3D) Cartesian coordinate system having a horizontal axis aligned with a longitudinal axis of the linear data storage medium, a vertical axis aligned with a minor axis perpendicular to the longitudinal axis of the linear data storage medium, and a transverse axis aligned with a transverse direction of the linear data storage medium.

3. The apparatus of claim 1, wherein the multiple actuators are mounted to one of the sliders and a feature supporting the sliders.

4. The apparatus of claim 1, wherein the multiple actuators comprise a first actuator that defines a vertical position of the slider, a first pair of actuators that operate in a coordinated fashion to define a penetration and a zenith position of the slider, a second pair of actuators that operate in a coordinated fashion to define a horizontal and an azimuth position of the slider, and a third pair of actuators that operate in a coordinated fashion to define a yaw position of the slider.

5. The apparatus of claim 1, further comprising a surface that the linear data storage medium moves across that is positioned to sandwich the linear data storage medium between the surface and the slider.

6. The apparatus of claim 5, wherein at least one actuator is mounted to the surface and defines the position of the slider relative to the surface of the linear data storage medium with at least one degree of freedom.

7. The apparatus of claim 1, wherein one or more of the read elements and servo elements generate a readback signal based on one or more of the servo marks, a recorded signal, and an unrecorded signal read from the linear data storage medium, the apparatus further comprising a controller that processes the readback signal to determine a quality of the interface between the slider and the linear data storage medium and controls the multiple actuators based on the quality of the interface.

8. The apparatus of claim 1, further comprising one or more guides to position the linear data storage medium relative to the slider, wherein the slider, multiple actuators, and guides are held in a head assembly nest structure.

9. The apparatus of claim 8, further comprising a different slider including at least one of one or more read elements to read data from the linear data storage medium and one or more write elements to write data to the linear data storage medium, and one or more servo elements to read servo marks from the linear data storage medium, a different set of multiple actuators to define a position of the different slider relative to the surface of the linear data storage medium with multiple degrees of freedom, a different one or more guides to position the linear data storage medium relative to the different slider, and a different head assembly nest structure that holds the different slider, different multiple actuators, and different guides, the head assembly nest structures located on one of the same side of the linear data storage medium and opposite sides of the linear data storage medium.

10. The apparatus of claim 9, wherein the multiple actuators position the slider in response to readback signals generated by the one or more of the read elements and servo elements on the slider and the different set of multiple actuators position the different slider in response to readback signals generate by the one or more different read elements and servo elements.

11. The apparatus of claim 8, further comprising a different slider including at least one of one or more read elements to read data from the linear data storage medium and one or more write elements to write data to the linear data storage medium and one or more servo elements to read servo marks from the linear data storage medium, a different set of multiple actuators to define a position of the different slider relative to the surface of the linear data storage medium with multiple degrees of freedom, wherein the guides restrict the movement of the linear data storage medium from unwanted directions and positions the linear data storage medium relative to both sliders and the head assembly nest structure also holds the different slider and different set of multiple actuators.

12. The apparatus of claim 11, wherein the multiple actuators position the slider in response to readback signals generated by the one or more of the read elements and servo elements on the slider and the different set of multiple actuators position the different slider in response to readback signals generate by the one or more different read elements and servo elements.

13. The apparatus of claim 1, wherein a track pitch of the linear data storage medium is less than approximately one micron.

14. The apparatus of claim 1, wherein data on the linear data storage medium is recorded using at least one of an orthogonal recording technique and an azimuth recording technique.

15. A linear data storage system comprising:
   a first slider including one or more read elements to read data from a linear data storage medium and a first servo element to read servo marks from the linear data storage medium;
   a first set of multiple actuators to define a position of the first slider relative to a surface of the linear data storage medium with multiple degrees of freedom;
   a second slider including one or more write elements to write data to a linear data storage medium and a second servo element to read servo marks from the linear data storage medium; and
   a second set of multiple actuators to define a position of the second slider relative to the surface of the linear data storage medium;
   one or more guides that restrict the movement of the linear data storage medium from unwanted directions and position the linear data storage medium relative to the first and second sliders; and
   a controller to receive the readback signals generated by one or more of the first and second read elements and servo elements and control the first and second sets of multiple actuators based on the readback signals,
   wherein the first and second sliders, first and second sets of multiple actuators, and guides are held in a nest structure of a head assembly.

16. The system of claim 15, wherein the multiple degrees of freedom include two or more of a vertical position, a horizontal position, a transverse position, a zenith position, an azimuth position, and a yaw position of the slider relative to the surface of the linear data storage medium, wherein the position of the slider is defined in accordance with a three-dimensional (3D) Cartesian coordinate system having a horizontal axis aligned with a longitudinal axis of the linear data storage medium, a vertical axis aligned with a minor axis perpendicular to the longitudinal axis of the linear data storage medium, and a transverse axis aligned with a transverse direction of the linear data storage medium.

17. The system of claim 15, wherein a track pitch of the linear data storage medium is less than approximately one micron.

18. The system of claim 15, wherein data on the linear data tape medium is recorded using at least one of an orthogonal recording technique and an azimuth recording technique.

19. The system of claim 15, further comprising a different head assembly including a third slider including a different one or more read elements and a third servo element, a third set of multiple actuators to define a position of the third slider relative to the linear data storage medium with multiple degrees of freedom, a fourth slider including a different one or more write elements and a fourth servo element, a fourth set of multiple actuators to define a position of the fourth slider relative to the linear data storage medium with multiple degrees of freedom, a different one or more guides that restrict the movement of the linear data storage medium from unwanted directions and position the linear data storage medium relative to the third and fourth sliders, and a nest structure that holds the third slider, third set of multiple actuators, fourth slider, fourth set of multiple actuators, and the different guides, wherein the nest structures are located on one of the same sides of the linear data storage medium and opposite sides of the linear data storage medium, the controller controls the third and fourth sets of multiple actuators based on the readback signals generated by the third and fourth read elements and fourth servo element, and the first and second sliders read and write data to one side of the linear data storage medium and the third and fourth sliders read and write data to the opposite side of the linear data storage medium.

20. A method for positioning a slider in a linear data storage system comprising:

receiving one or more readback signals from a slider that includes one or more read elements and sensors to read at least one of a recorded and an unrecorded signal from a linear data storage medium;

processing the readback signal to determine a position of the slider relative to the linear data storage medium; and adjusting the position of the slider with more than one degree of freedom based on the determined position via one or more actuators, wherein the slider includes at least one of one or more read elements that read data from the linear data storage medium and one or more write elements that write data to the linear data storage medium, and the degrees of freedom include more than one of a vertical position, a horizontal position, a transverse position, a zenith position, an azimuth position, and a yaw position of the slider relative to the surface of the linear data storage medium, wherein the position of the slider is defined in accordance with a three-dimensional (3D) Cartesian coordinate system having a horizontal axis aligned with a longitudinal axis of the linear data storage medium, a vertical axis aligned with a minor axis perpendicular to the longitudinal axis of the linear data storage medium, and a transverse axis aligned with a transverse direction of the linear data storage medium.

* * * * *